(12) United States Patent
Elder et al.

(10) Patent No.: US 12,394,006 B1
(45) Date of Patent: Aug. 19, 2025

(54) CONTEXTUAL SCENARIO ASSESSMENT

(71) Applicant: Palantir Technologies Inc., Denver, CO (US)

(72) Inventors: Andrew Elder, Greenwood Village, CO (US); Anand Gupta, Denver, CO (US); Cassandra Wang, Breckenridge, CO (US); Daniel Cervelli, Wanaka (NZ); Jessica Headrick, Naples, FL (US); Timothy Wilson, Palo Alto, CA (US)

(73) Assignee: Palantir Technologies Inc., Denver, CO (US)

( * ) Notice: Subject to any disclaimer, the term of this patent is extended or adjusted under 35 U.S.C. 154(b) by 564 days.

(21) Appl. No.: 17/584,284

(22) Filed: Jan. 25, 2022

Related U.S. Application Data

(60) Provisional application No. 63/141,463, filed on Jan. 25, 2021.

(51) Int. Cl.
*G06Q 50/26* (2024.01)
*G06N 20/00* (2019.01)

(52) U.S. Cl.
CPC .......... *G06Q 50/265* (2013.01); *G06N 20/00* (2019.01)

(58) Field of Classification Search
CPC .............................. G06Q 50/265; G06N 20/00
See application file for complete search history.

(56) References Cited

U.S. PATENT DOCUMENTS

| | | |
|---|---|---|
| D726,758 S | 4/2015 | Bourret et al. |
| D765,688 S | 9/2016 | Mesguen et al. |
| D794,670 S | 8/2017 | Lee et al. |
| D797,124 S | 9/2017 | Lee et al. |
| D809,554 S | 2/2018 | Lu |
| D812,634 S | 3/2018 | Tuthill et al. |
| D814,493 S | 4/2018 | Brody |
| D844,668 S | 4/2019 | Lee et al. |
| D845,316 S | 4/2019 | Li et al. |
| D874,482 S | 2/2020 | Ishigaki et al. |
| 10,559,180 B2 * | 2/2020 | Pourmohammad ... H04W 4/021 |
| D892,131 S | 8/2020 | Pazmino et al. |
| D910,072 S | 2/2021 | Cazamias |
| D914,759 S | 3/2021 | Mariani et al. |
| D916,751 S | 4/2021 | La Guardia et al. |
| D955,412 S | 6/2022 | Jegarajan et al. |
| D971,248 S | 11/2022 | Chaudhri et al. |

(Continued)

OTHER PUBLICATIONS

Sikder, Amit Kumar, et al. "A survey on sensor-based threats and attacks to smart devices and applications." IEEE Communications Surveys & Tutorials 23.2 (2021): 1125-1159. (Year: 2021).*

(Continued)

*Primary Examiner* — Corey Russ
(74) *Attorney, Agent, or Firm* — Sheppard Mullin Richter & Hampton LLP

(57) ABSTRACT

Systems, methods, and non-transitory computer readable media are provided for generating or obtaining situations in which scores indicative of a danger or a hazard exceeds a threshold, receiving a selection of a first situation, in response to receiving the selection of the first situation, obtaining intelligence data, asset data, and operational data, analyzing the intelligence data using a trained machine learning model for the first situation; and determining a response measure based on the analyzed intelligence data.

20 Claims, 32 Drawing Sheets

(56) References Cited

U.S. PATENT DOCUMENTS

| | | | | |
|---|---|---|---|---|
| D971,943 | S | 12/2022 | Kuwatani et al. | |
| 2004/0075552 | A1* | 4/2004 | Rao | G08B 27/005 |
| | | | | 340/539.1 |
| 2009/0177602 | A1* | 7/2009 | Ning | B60W 40/09 |
| | | | | 706/21 |
| 2017/0322682 | A1* | 11/2017 | Humayun | G16H 40/20 |
| 2020/0094824 | A1* | 3/2020 | Schulter | B60W 30/0956 |
| 2020/0334448 | A1* | 10/2020 | Ghazaryan | G06V 10/82 |
| 2020/0387812 | A1* | 12/2020 | Lewis | G06N 20/20 |
| 2021/0168166 | A1* | 6/2021 | Liu | G06N 20/20 |
| 2021/0344726 | A1* | 11/2021 | Sharifi Mehr | H04L 63/1425 |
| 2022/0157147 | A1* | 5/2022 | Hasan | H04W 4/38 |
| 2022/0191217 | A1* | 6/2022 | Rose | H04L 63/1425 |
| 2022/0201030 | A1* | 6/2022 | Petit | H04L 63/20 |
| 2023/0004846 | A1* | 1/2023 | Dalli | G06N 5/01 |
| 2023/0136846 | A1* | 5/2023 | Rafferty | G06N 20/20 |

OTHER PUBLICATIONS

Notice of Allowance mailed Aug. 8, 2023, issued in related U.S. Appl. No. 29/767,786 (16 pages).

Neptune P2P Group, Risk and Security Risk Assessment Jun. 28, 2022, neptunep2pgroup.com, retrieved Jul. 21, 2023, https://neptunep2pgroup.com/risk-maps/risk-security-risk-assessment-q1-q2-2022/ (Year: 2022).

Coface Group, Ruben Nizard explains risk assessment map, Feb. 18, 2021, youtube.com, retrieved Jul. 21, 2023, https://www.youtube.com/watch?v=ccYqU7c9vxo (Year: 2021).

Alban, Courtney, Space Fence, Apr. 22, 2022, c4isrnet.com, retrieved Jul. 21, 2023, https://www.c4isrnet.com/battlefield-tech/space/2022/04/22/space-fence-now-has-a-direct-link-to-key-space-force-data-hub/ (Year: 2022).

* cited by examiner

FIG. 2

CONTEXTUAL SCENARIO ASSESSMENT

CROSS REFERENCE TO RELATED APPLICATIONS

This application claims the benefit under 35 U.S.C. § 119(e) of U.S. Provisional Application No. 63/141,463 filed Jan. 25, 2021, the content of which is incorporated by reference in its entirety into the present disclosure.

FIELD OF THE INVENTION

This disclosure relates to approaches for contextual scenario assessment.

BACKGROUND

Under conventional approaches, data may be searched for and retrieved in a data store. However, with the growing amount of data and devices that capture data that are available, the mere searching and viewing of data may lack context.

SUMMARY

Various embodiments of the present disclosure may include systems, methods, and non-transitory computer readable media configured to provide a plurality of situations or scenarios (hereinafter "situations") at a user interface, determining that the situations are associated with respective scores that exceed a threshold; in response to receiving a selection of a first situation of the plurality of situations at the user interface, obtain intelligence data, asset data, and operational data for the situation; dynamically generate an assessment using the intelligence data, asset data, and operational data for the situation; and provide an interface through which the assessment for the situation is accessible.

In some examples, the systems, methods, and non-transitory computer readable media may perform generating or obtaining situations in which scores indicative of a danger or a hazard exceeds a threshold, receiving a selection of a first situation, in response to receiving the selection of the first situation, obtaining intelligence data, asset data, and operational data, analyzing the intelligence data using a trained machine learning model for the first situation; and determining a response measure based on the analyzed intelligence data.

In some examples, the machine learning model may be trained using a sequential training process. The sequential training process may include obtaining previous intelligence data from previous situations, modifying the previous intelligence data to generate modified previous intelligence data, creating a first training set comprising the previous intelligence data, the modified previous intelligence data, and spurious intelligence data, training the machine learning model in a first stage using the first training set, creating a second training set for a second stage of training comprising a subset of the first training set that was incorrectly analyzed after the first stage of training, and training the machine learning model in the second stage using the second training set.

In some examples, the instructions further cause the system to perform, in response to obtaining intelligence data, asset data, and operational data, determining whether a metric of the obtained intelligence data, asset data, or operational data exceeds a threshold, in response to determining that the metric of the obtained intelligence data, asset data, or operational data exceeds a threshold, obtaining additional intelligence data, asset data, or operational data at a faster rate or from an additional source.

In some examples, the metric is indicative of a level of variability or volatility of the intelligence data, asset data, or operational data.

In some examples, the determination of the response measure is based on previous response measures corresponding to a same type of situation as the first situation and in which an extent of the same type of situation is within a threshold range of that of the first situation.

In some examples, the instructions further cause the system to perform, in response to determining a response measure based on the analyzed intelligence data, transmitting the determined response measure to a different computing system to implement the response measure.

In some examples, the instructions further cause the system to perform generating a first video of the analyzed intelligence data on a user interface, detecting a selection or an interaction with an entity or object on the user interface, and in response to the detection, generating a second video of the entity or the object that is larger than the first video as an overlay.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

A claimed solution rooted in computer technology overcomes problems specifically arising in the realm of computer technology. In various implementations, a computing system is configured to providing a data structure and user interface.

Figure 1:
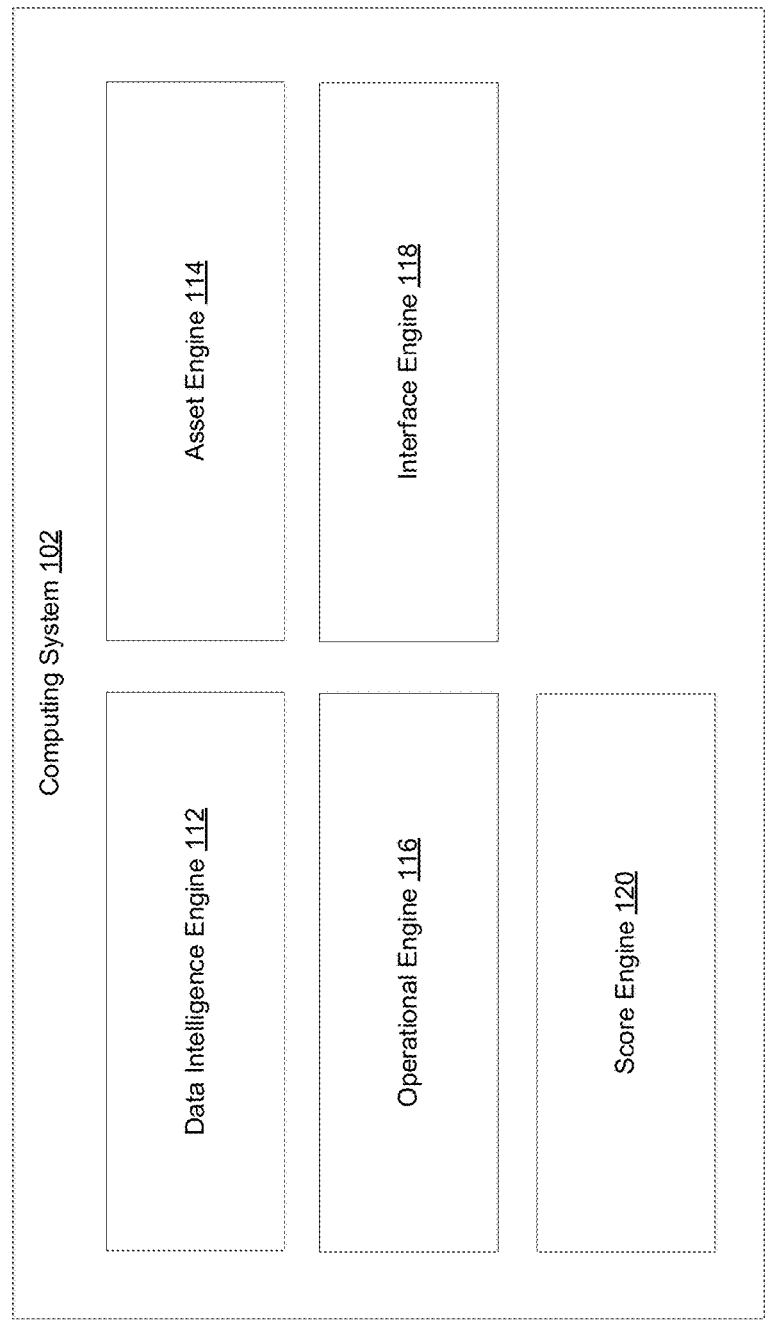
FIG. 1 illustrates an example computing system for providing a data structure and user interface, in accordance with various embodiments.

FIG. 1 illustrates an example computing system in accordance with various embodiments. Environment 100 may include computing system 102. Computing system 102 may include one or more processors and memory. The processor(s) may be configured to perform various operations by interpreting machine-readable instructions stored in the memory. Environment 100 may also include one or more datastores that are accessible to computing system 102 (e.g., via one or more network(s)). In some embodiments, the datastore(s) may include various databases, application functionalities, application/data packages, and/or other data that are available for download, installation, and/or execution.

In various embodiments, computing system 102 may include data intelligence engine 112, asset engine 114, operational engine 116, interface engine 118, score engine 120, and/or other engines. While computing system 102 is shown in FIG. 1 as a single entity, this is merely for ease of reference and is not meant to be limiting. One or more components/functionalities of computing system 102 described herein may be implemented, in whole or in part, within a single computing device or within multiple computing devices.

In various embodiments, data intelligence engine 112 is configured to receive intelligence data from various sources, including sensors (e.g., signals, time-series data, streaming data feed, etc.), human intelligence (e.g., reports, spreadsheets, data entry, etc.), and data generated by user devices (e.g., images, audio, video, etc.). The intelligence data may be raw data transmitted actively by an originating device or passively acquired by data intelligence engine 112 via a network.

In various embodiments, data intelligence engine 112 is configured to analyze, examine, load, review, store, and/or otherwise process the intelligence data. In some examples, the data intelligence engine 112 may determine whether the intelligence data exceeds a threshold metric, such as, a threshold degree of variability or volatility or whether the intelligence data indicates an impending dangerous situation with a threshold probability. For example, the degree of variability may be indicative of a signal strength or signal fidelity, an extent of a breach, and/or a location of an incoming situation or object. If so, the data intelligence engine 112 may collect additional intelligence data at a faster rate and/or from additional sources. The analyzed intelligence data may identify patterns, processes, outcomes, or other data from the intelligence data. In some examples, data intelligence engine 112 employs a trained machine learning model to apply the intelligence data as input to the trained machine learning model to output results, or analyzed intelligence data. The training of the machine learning model may be iterative or sequential. For example, the training of the machine learning model may encompass a first stage in which a first set of training data is inputted to the machine learning model. The first set of training data may include data from sensors (e.g., signals, time-series data, streaming data feed, etc.), human intelligence (e.g., reports, spreadsheets, data entry, etc.), and data generated by user devices (e.g., images, audio, video, etc.). The machine learning model may determine a degree of authenticity of the training data, and/or perform assessments or predictions based on the first set of training data. Subsequently, a second set of training data may be created and include the first set of training data and/or any intelligence data that is incorrectly analyzed, for example, in which the analysis of the intelligence data deviates by at least a threshold amount from a standard indicative of a proper analysis, or in which an error exceeds a threshold measure, amount, score, or proportion. For example, incorrect analysis may include, incorrectly determining or predicting an impact of a certain subset of the intelligence data, and/or incorrect assessment or determination of a veracity of a certain subset of the intelligence data. The machine learning model may be trained using the second set of training data. The machine learning model may continuously be trained using subsequent sets of training data created, based on any intelligence data that was/were incorrectly analyzed in a previous stage. The subsequent sets of training data may be created based on a combination of previous sets of training data that may be intertwined or otherwise combined with the subsequent sets of training data.

The trained machine learning model may, in addition to determining or assessing a degree of authenticity of the intelligence data, determine or predict whether or not a particular situation or entity poses a danger, if so, a level of danger and a degree of permanence of the danger, and an impact of the particular situation or entity upon other situations or entities. For example, a possible security or other breach or infiltration may be predicted to affect a particular network or system (e.g., a computer or electronic network or system), which may be connected to or associated with other networks or systems that may also be predicted to be affected. As part of the training process of the machine learning model, the machine learning model may determine feature weights of parameters or characteristics in determining a reliability or emphasis of the intelligence data, such as a time at which the intelligence data was collected, a source of the intelligence data, and/or a degree of variability (e.g., a degree indicating whether the intelligence data includes consistent information or conflicting information). For example, a degree of recency of the intelligence data may be a more important, or heavier weighted factor, compared to a source of the intelligence data, and thus a feature weight corresponding to the degree of recency may exceed a feature weight corresponding to a source of the intelligence data.

From the determination or prediction of the trained machine learning model, the computing system 102 and/or the machine learning model, or an other machine learning model, may determine a response measure. The computing system 102 may implement the response measure and/or transmit an indication to a different computing system to implement the response measure. The response measure may include, for example, shutting down or partially deactivating certain affected electronic systems or components or any of electronic systems or components predicted to be affected. The determination of the response measure may include determining a duration or interval over which the electronic systems or components are shut down or partially deactivated. In some examples, the response measure may additionally or alternatively include activating backup electronic systems or components, for example, which may not be compromised. In some examples, the response measure may additionally or alternatively include encrypting data transmission, or using an alternative data security measure such as an alternative data encryption technique. In some examples, the response measure may include increasing a security of a physical component, such as activating a barricade, shield, or other protection mechanism at a particular location predicted to be affected.

In various embodiments, data intelligence engine 112 is configured to store data or acquire stored data (or analytics) from one or more storage locations. A storage location may refer to electronic storage located within computing system 102 (e.g., integral and/or removable memory of computing system 102), electronic storage coupled to computing system 102, and/or electronic storage located remotely from computing system 102 (e.g., electronic storage accessible to computing system 102 through a network). Data may be obtained from one or more databases. Data may be stored within a single file or across multiple files. For example, resource customization information have been ingested into a database as one or more objects, and the data intelligence engine 112 may retrieve the object(s) to obtain the data.

Generation and maintenance of the sensor, human intelligence, and data generated by user devices may be implemented by other systems as well.

In various embodiments, asset engine 114 is configured to receive asset data associated with various assets, including vehicles, equipment, materials, supplies, and/or human operators. Each asset may be associated with a plurality of parameters, including a description (e.g., name, make/model of vehicle, etc.), an asset type (e.g., soldier, administrator, vehicle, helicopter, etc.), skills (e.g., equipment carried by vehicle, combat or clearance level of soldier, location of soldier, training level or courses taken by soldier, etc.), response plans that asset has been involved with, or past or current locations (e.g., building A1, city/country data, etc.). The asset data may be transmitted actively by the originating device or passively acquired by asset engine 114 via a network.

The asset data may comprise additional information as well, including availability of the asset (e.g., a status of the asset as the availability of the asset for relocation or participation in a response plan). The status may be identified on a range of values (e.g., ready now, ready in 1 hour, etc.), a binary value (e.g., ready for use or unavailable, etc.), or an textual value (e.g., an issue that would cause the asset to be unavailable or indicative of a reason of unavailability like "missing wheel," "broken engine," "needs gasoline," etc.).

Asset data may be generated by a skilled user physically assessing each asset and/or an automated process that can dynamically identify the status or availability of the asset. Alternatively or additionally, the asset data may be derived and/or obtained from external databases. For example, a user may access a vehicle and visually identify that all four wheels are present, that the engine is operational (e.g., by turning on the vehicle and/or driving the vehicle to confirm its operational status, etc.), and the like. In some examples, an image recognition process may assess the status of assets at a geographic location (e.g., matching an object in the image with a known shape of a working asset of the same type in a data store, etc.).

Generation and maintenance of the asset data may be implemented by other systems as well.

In various embodiments, operational engine 116 is configured to receive operational data associated with various assets, including vehicles, equipment, materials, supplies, and/or human operators. Operational data may comprise real-time data of the asset, using one or more computing devices or other sensors embedded, attached, worn, or otherwise associated with the asset. As an illustrative example, an asset may include a sensor that locally calculates a location, time, speed, and direction that the sensor travels, or may communicate with a remote system to transmit signals between the sensor and remote system to calculate the same information. The operational data may be transmitted actively by the originating sensor or passively acquired by operational engine 116 via a network.

In some examples, operational data may include real-time images, video, audio, and the like collected by a wearable device of the asset and transmitted to operational engine 116 via the network. Operational data from a first source (e.g., streaming video from a wearable device of the asset at a particular location on the ground, etc.) and operational data from a second source (e.g., streaming video from an unmanned aerial vehicle (UAV) at the same location in the air, etc.) may be combined to generate aggregated operational data. The aggregated operational data may include data from a plurality of perspectives associated with the particular location. This may be helpful when a field of view (e.g., an asset on the ground, etc.) is obstructed from any perspective of operational data source, and a second asset is added to supplement the operational data (e.g., a UAV from the air, etc.). In some examples, the perspectives may be captured by different sensors, such as a camera, a Lidar sensor, an inertial measurement unit (IMU), a radar sensor, a GPS or GNSS sensor, an accelerometer, a gyroscope, a magnetometer, and a FIR (far infrared) sensor. In some examples, the sensor data from any of the aforementioned sensors, or other sensors, may be fused. As a particular example, odometry data from the IMU and the GPS may be fused or synchronized with Lidar data.

Operational data may also provide updated data for a response plan. The operational data may be used, for example, to identify the status of the response plan and any changes, in real time, as they are occurring with the asset involved in the response plan.

Generation and maintenance of the operational data may be implemented by other systems as well, including with the computing system described in U.S. Patent Publication No. 2017/0329569 and U.S. Pat. No. 10,380,196, which are herein incorporated by reference for all purposes.

In various embodiments, the interface engine 118 is configured to provide one or more interfaces through which an assessment is accessible. The interface(s) may include application program interface(s) (APIs) and/or user interface(s). For example, the interface engine 118 may provide (e.g., make available for use, supply) one or more APIs that may be used by users/computing systems to access (e.g., activate, identify, load, open, retrieve, view) an analysis or assessment using various data described herein. As another example, the interface engine 118 may provide (e.g., generate, present, display, etc.) one or more user interfaces (e.g., web user interface accessible through a browser) through which users may access an analysis or an assessment.

The interface(s) provided by the interface engine 118 may enable presentation of an analysis or an assessment in one or more user interfaces. In some embodiments, a presentation of the analysis or assessment (hereinafter "assessment") may include a preview of a resource and/or a preview of a portion of the resource. That is, rather than presenting a textual description of the assessment, such as a label/name of the assessment, or the associated resource/portion of the resource, the presentation of the assessment may include a visualization of the assessment using intelligence data, asset data, and/or operational data. For instance, a presentation of the assessment effectuated through the interface(s) provided by the interface engine 118 may include a visual representation of the intelligence data, asset data, and/or operational data which is presented based on activation of the assessment via a response plan and/or situation. For example, a presentation of the assessment may include visual images associated with a situation and/or action steps of the response plan. In some embodiments, the generation and/or the activation of the assessment may be tracked to provide a usage summary of the asset.

In various embodiments, the score engine 120 is configured to generate one or more scores using intelligence data, asset data, and/or operational data. For example, a number of assets (e.g., humans, planes, trucks, equipment, etc.) may correspond with an asset count score and an amount of time needed to implement the response plan may correspond with a time score. Other scores are available as well, including a complexity score (e.g., a number of steps to be performed by each of the assets involved in the response plan in comparison to a threshold value, etc.), a movement score (e.g., a change in distance or location required by each asset involved in the response plan in comparison to a threshold distance value, or a distance value multiplied by a number of assets moving that distance, etc.), a safety score (e.g., a number of interactions expected with dangerous objects in comparison to a threshold value, a number of weapons required in comparison to a threshold value, or a path traversing a volatile area in comparison to a threshold value, etc.), a success likelihood score (e.g., a comparison of the similarities between a response plan to a training exercise or previously completed response, etc.), and the like. Each of the aforementioned scores may be decomposed into specific factors that were used to determine that particular score. A user may click on a score to view the specific factors, metrics, and/or calculations that led to this score. If the time score is "High," for example, the score engine 120 may show a distribution plot of similar plan durations and illustrate that this selected plan is among the longest, along with specific metrics about average and standard deviation.

Scores may be determined for known images. The predetermined calculation of the score may be automatically associated with the item or image. For example, vehicles or weapons that are used in combat situations may be automatically associated with a high score (e.g., a score above a threshold). When an image of the vehicle or weapon is identified (e.g., from a data store of known images, or a new image received with operational data, etc.), the score corresponding with those identified items may be associated with the image.

In various embodiments, score engine 120 is also configured to compare the one or more scores with one or more threshold values. The threshold values may vary by implementation. As an illustrative example, the threshold values correspond with a predetermined value (e.g., less than fifteen hours, less than forty action steps, etc.). The threshold values may be altered based on a user profile of the user operating the user interface and accessing the data (e.g., less than thirteen hours, less than thirty action steps, etc.) or other means.

In various embodiments, score engine 120 is configured to combine or otherwise aggregate the scores to identify an overall score for a response plan. For example, the first response plan may correspond with a first score and a second response plan may correspond with a second score. The overall score may correspond with an average or an aggregation of these scores.

One or more of these scores may be identified as an outlier in a standard deviation of scores corresponding to the plurality of response plans, and the score may affect the overall score for the response plan disproportionately from the other scores. In some examples, the standard deviation may replace a predetermined threshold value associated with the score. The outlier score may be identified at the user interface (e.g., as a flag, etc.).

In various embodiments, data from data intelligence engine 112, asset engine 114, operational engine 116, and/or interface engine 118 may be combined. For example, data from these and other sources may be combined together to provide information in relation to a geographic location and/or response plan to associate similar data for a "situation" data type. As an illustrative example, Situation A may be identified at a user interface generated by interface engine 118. Intelligence data generated and stored by data intelligence engine 112, asset data generated and stored by asset engine 114, and operational data generated and stored by operational engine 116 may be received and stored in a data store (e.g., for quick access to the most recent and dynamic information provided by each engine, etc.). One or more scores or an overall score determined by score engine 120 may also be stored in the data store. This relevant data may be associated with Situation A. Interface engine 118 may populate the user interface using data from the data store to limit the amount of data that is accessed and beneficially increase processing speeds for the system overall. The limitation of the data may also help display relevant data for the user to focus visual presentation of data to the selected geographic location and/or response plan to Situation A.

An analysis of the data store may be implemented to identify patterns or similarities between past intelligence data, asset data, operational data, etc. and new incoming data, or past response plans and suggested response plans in view of the new incoming data. Response plans implemented in response to the past data may be provided in a user interface as a suggested response plan to the new incoming data. An estimated time duration for the suggested response plan may be based, at least in part, on the time duration needed to implement the response plan previously. In some examples, a similarity score may be calculated to identify a degree of similarity between the past data and new incoming data.

Figure 2:
FIG. 2 illustrates a user interface for generating a situation, in accordance with various embodiments.
Figure 2:
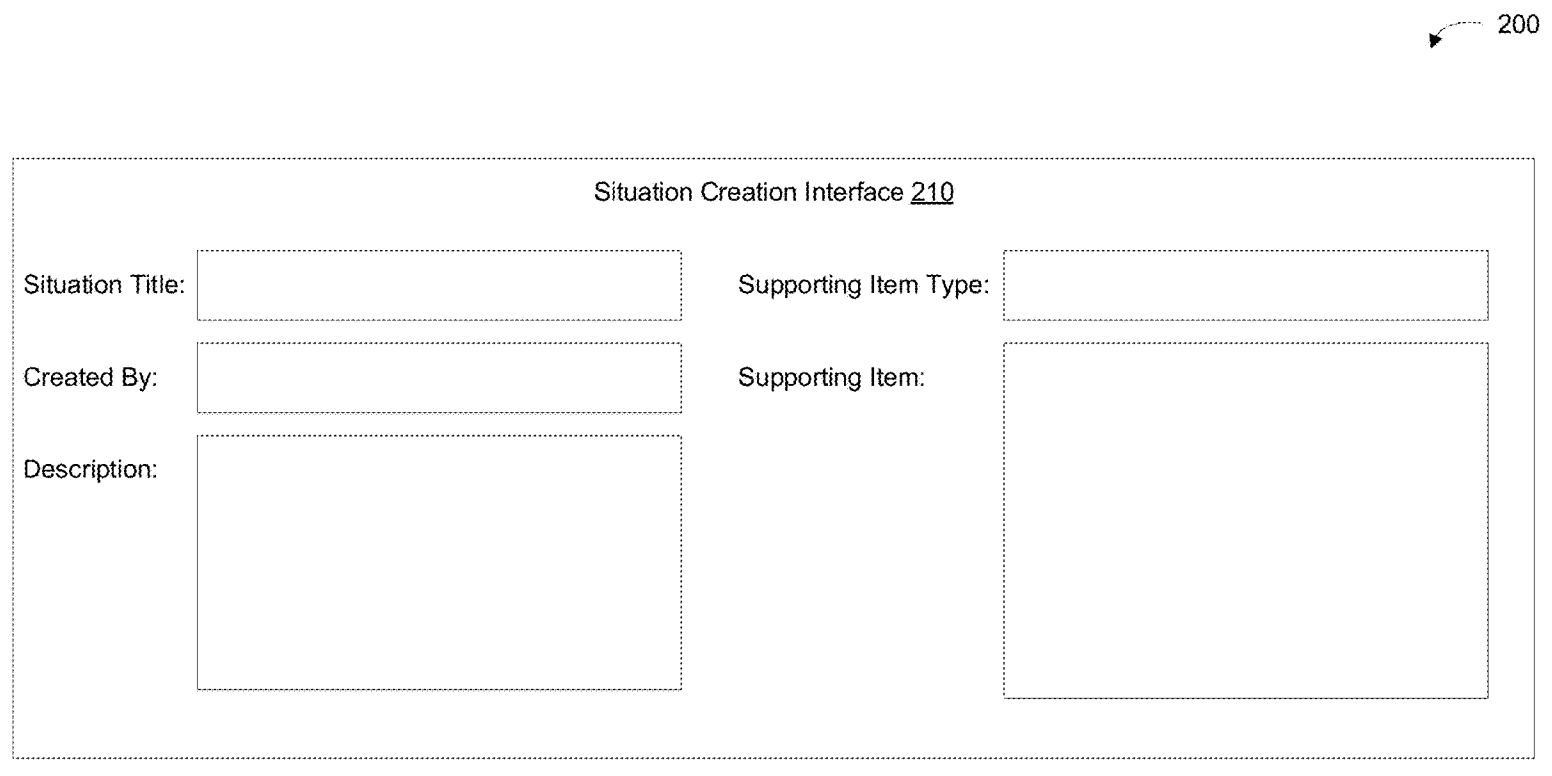

FIG. 2 illustrates a user interface for generating a situation. User interface 200 may comprise an interface for generating a situation, including a title of the situation, creator of the situation, description of the situation, geographic location of the situation, and/or one or more supporting items that identify that a situation exists. The supporting items may include text, images, video, audio, human intelligence, signals or sensor data, and the like. An administrative user may attach these supporting items at the user interface 200. Using the supporting items provided in this user interface, each of the supporting items may be initially identified as an icon in a user interface provided for displaying information associated with the situation. Additional detail associated with the supporting items may be provided in a user interface as well.

Figure 4:
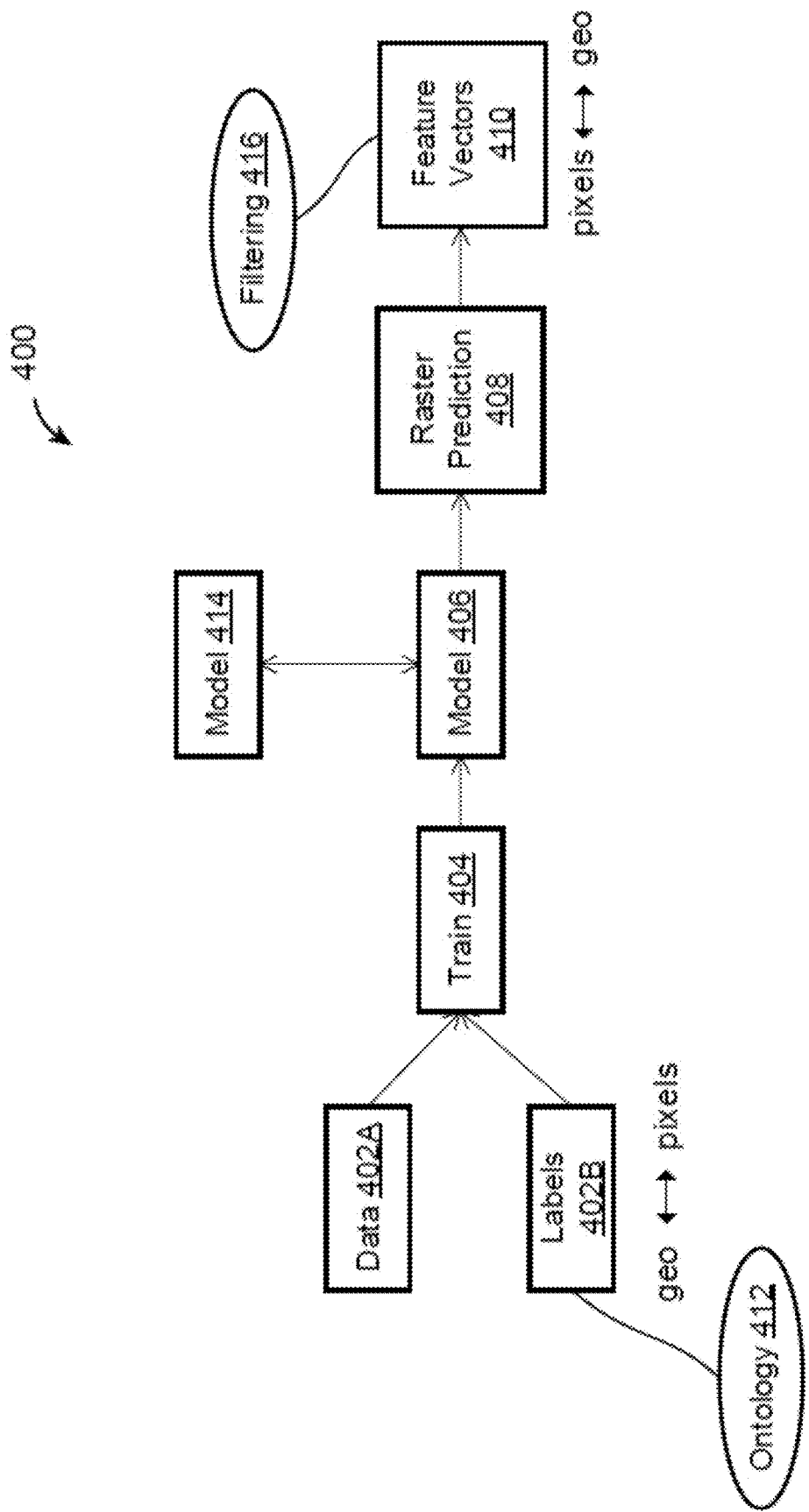
FIG. 4 illustrates an example process of image recognition, in accordance with various embodiments.

In some instances, supporting items may be collected dynamically, as further illustrated with FIG. 4. For example, a vehicle, person, equipment, or other object in an image may be identified through image recognition (e.g., matching an object in the image with a known shape into a data store, etc.). The supporting item for the situation may be automatically added to the situation when the match likelihood exceeds a match threshold (e.g., between the received image and the known/labeled image, etc.). The original image and type of supporting item identified through image recognition may be dynamically associated with the situation and stored to access and provide at a user interface at a later time when the supporting items are presented with the situation. Geographic locations may be added for the situation data as well (e.g., matching a geographic location of the object in the image with a triangulated geographic location or GPS positioning system, etc.).

In some instances, supporting items may be collected by a broad area search of a geographic area. For example, satellite images of large areas may be provided to an image recognition process, where various items may be recognized. Each item may correspond with a score. When an item recognized through the image recognition process corresponds with a score that exceeds a threshold, the item and its corresponding geographic location may be identified as a new situation. In some examples, the creation of a new situation may originate with the identification of the item with a score that exceeds a threshold, without user intervention (e.g., via interface 200, etc.). The supporting item for the situation may be an image of the item recognized through the image recognition process. In some examples, situations that are dynamically generated may be cross-checked with other data sources to confirm authenticity (e.g., intelligence data generated and stored by data intelligence engine 112, asset data generated and stored by asset engine 114, and operational data generated and stored by operational engine 116, etc.).

Figure 3:
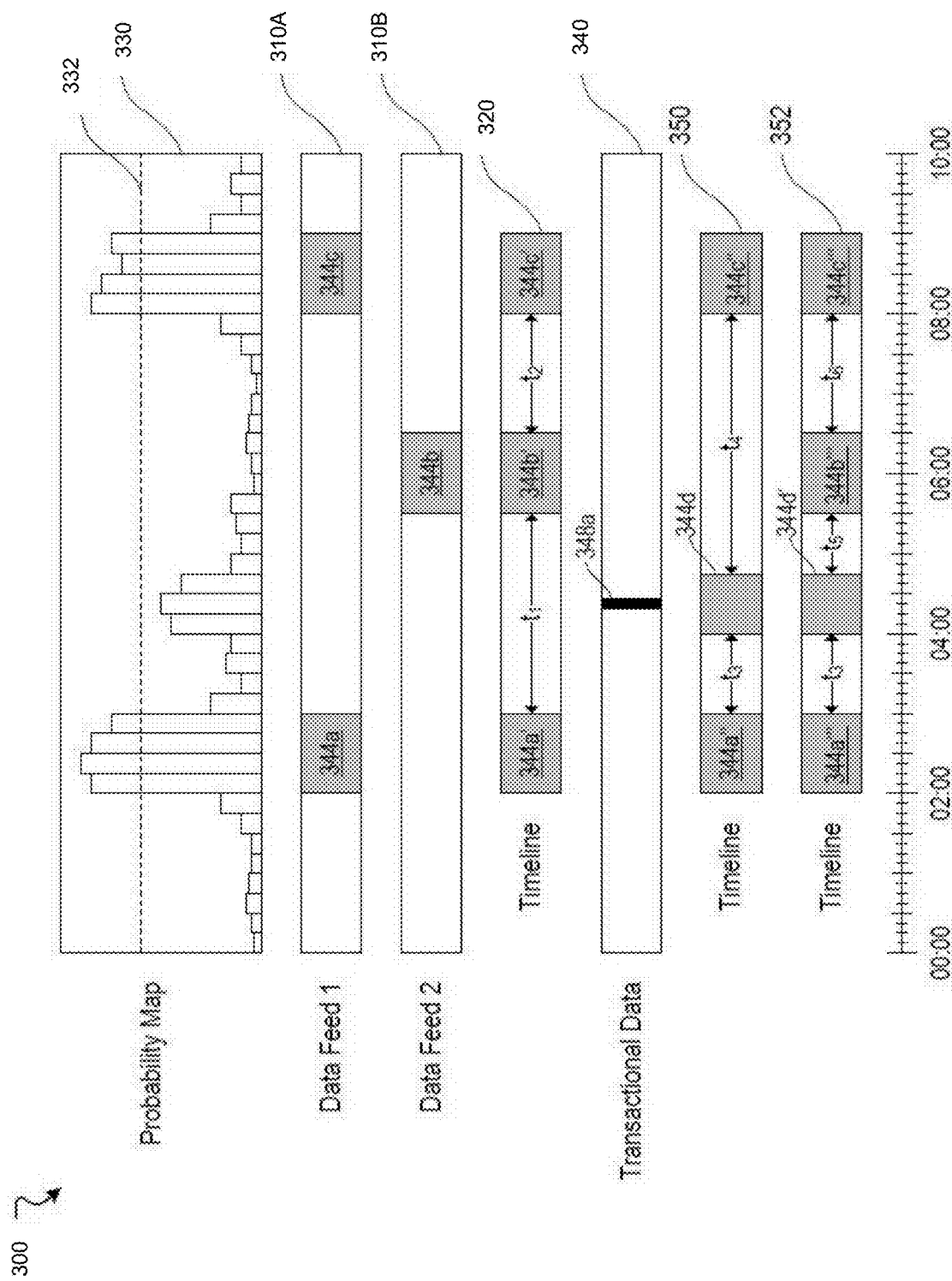
FIG. 3 illustrates an example of processing and aggregating data, in accordance with various embodiments.

FIG. 3 illustrates an example of processing and aggregating data, in accordance with various embodiments. For example, a plurality of data sources may include intelligence data, asset data, operational data. In some examples, data sources may include one or more data files or feeds, including audio clips, images, mapping information, video, or any combinations thereof that may be saved as snippet elements with corresponding metadata information. The metadata information can include location information (e.g., "ABC City"), timestamp information (e.g., elapsed timeline, "date," and "time"), and elapse time of the data (e.g., "Tagged Event"). In some cases, the user may add annotations to describe items in the snippet (e.g., the "dump truck" and the "passenger car") being depicted in each snippet.

An illustrative example 300 of snippets and various transactional data are provided, where the data are analyzed to determine various activities associated with an entity, in accordance with various embodiments. The diagram 300 shows data feeds 310A and 310B. In this example, the user while accessing the data feed 310A, tags an entity depicted in the data feed 310A at two different times. The computing system 102, in response, saves portions of the data feed 310A where the user tagged the entity as snippets 344a and 344c. Also, in the example, the user, while accessing the data feed 310B, tags an entity (e.g., the same entity as in the data feed 310A) depicted in the data feed 310B. Computing system 102, in response, saves a portion of the data feed 310B where the user tagged the entity as a snippet 344b. In some embodiments, computing system 102, upon receiving an instruction from the user, can align the snippets 344a, 344b, and 344c based on their respective timestamp information (e.g., saved as metadata) and construct timeline 320 with the snippets 344a, 344b, and 344c (shown as 344a', 344b', and 344c'). In some cases, a cluster the snippets 344a, 344b, and 344c can be stored based on their respective location information (not shown). Based on timeline 320, the user may infer various insights about the entity (e.g., operational data, asset data, etc.). For example, the data feed 310A may correspond to a video feed of store ABC and the data feed 310B may correspond to a video feed of store XYZ. Further, in this example, the entity is a person. In this example, by aligning the snippets 344a, 344b, and 344c and constructing timeline 320, the user interacting with a user interface provided by computing system 102 may infer that the person was at the store ABC at an initial time. After some time ("t1"), the person went to the store XYZ. After another time ("t2"), the person went back to the store ABC.

In some embodiments, a data feed can be associated with a probability map 330. In this example, the probability map 330 is associated with the data feed 310A and displays a probability of a known entity being depicted in the data feed 310A. For example, when a user accesses the data feed 310A, computing system 102 determines, in real-time or near real-time, whether an entity depicted in the data feed 310A is a known entity and calculates a probability for the determination. When the probability satisfies a threshold value 332, computing system 102 may suggest to the user to tag the known entity. In some cases, computing system 102 can automatically tag the known entity. For example, continuing from the example discussed above, while the user is accessing the video feed (data feed 310A) of the store ABC through computing system 102, computing system 102 identifies the person depicted in the video feed to be a known person using image recognition or computer vision. In this example, a suggestion may be presented to the user at the user interface to tag the person or, in some cases, automatically tags the person and stores a portion of the video feed depicting the person as a snippet. In various embodiments, computing system 102 may use various image recognition or computer vision techniques to identify entities and compare the entities to a database of known entities, as illustrated with FIG. 4.

In some embodiments, when determining activities associated with an entity, the user may additionally instruct computing system 102 to include transactional data 340. The transactional data 340, in various embodiments, can include various data that the user legally has access to, such as commerce transactions (e.g., credit card transactions), badge reader transactions for ingress and egress, network login transactions, and/or geolocation of IP addresses (e.g., internet protocol addresses). In such embodiments, computing system 102 can augment snippets (344a and 344b) with transactional data 340 and construct timeline 350 that includes both the snippets and transactional data 340 to infer various insights. For example, continuing from the example discussed above, while the user is accessing the video feed (the data feed 310A) of the store ABC through computing system 102, the user sees a person of interest and tags the person. At some time later ("t3"), the user is uncertain whether another person depicted in the video feed is the person of interest. In this case, the user can instruct computing system 102 to include transactional data (e.g., credit card transactions) associated with the person of interest. If the credit card transaction information includes an indication 348a that indicates the person had purchased an item form the store ABC, there is high probability that the another person depicted previously was indeed the person of interest. Accordingly, a snippet 344d corresponding to the another person can be saved. Therefore, in the example, the timeline 350 constructed includes snippets 344a", 344d, and 344c".

In some cases, computing system 102 can combine various snippets (e.g., the snippets 344a, 344b, and 344c) from various data streams (e.g., the data feeds 310A and 310B) with various transactional data (e.g., the transactional data 340) to construct timeline 352 for the user to infer various insights.

In some examples, the snippets can be overlaid on top of a map provided by a user interface. The map can indicate regions on the map that corresponds to where the snippets were captured. The regions are sized to match spatial coordinates of the map. In some embodiments, a path may be determined, based on timestamp and location information of the snippets, based on the times and geographic locations that the snippets were captured.

FIG. 4 illustrates an example process of image recognition, in accordance with various embodiments. For example, various processes may be used to label depictions of objects within images (e.g., static, streaming, real-time, etc.) by a machine learning model, broad area search, or other image recognition processes (e.g., matching an object in the video with a known shape into a data store, etc.).

In some embodiments, a label of the depiction of the object within the image may be used to train a machine learning model for identifying other depictions of the object within images. For example, the object may include a building and the labeling of the depiction of the building within the image may be used to train a machine learning model for identifying depictions of buildings within images. Identification of other depictions of the object within images may be filtered based on an object size criteria or an object shape criteria. For example, a size or a shape of a portion within an image may not correspond to the size or the shape of a building, and this portion within the image may be filtered out from being labeled as a building. The machine learning model may be used to detect changes in objects at a location over time.

In the overview 400, one or more inputs may be used to train 404 a model 406. For example, the inputs to train 404 the model 406 may include data 402A and labels 402B. The data 402A may include information stored in one or more databases. One or more transformation operations may be performed on the data 402A to prepare the data for model training. For example, the data 402A may include a combination of multiple sensor data, and the data 402A be prepared for training of the model 406 using normalization and/or merging operations. The labels 402B may include labeling of images/objects depicted within images. The labels 402B may provide for transformation of information in a geo-spatial space to a pixel space. For instance, the labels 402B may transform locations of objects (e.g., buildings) into labeling of corresponding pixels within images. The labels 402B may use an ontology 412 that defines a structure for object labeling or object types. For example, the ontology 412 may define different types of objects (e.g., buildings vs vehicles) and/or different categories of a type of object (e.g., buildings with different shapes, buildings with different purposes, commercial vs residential vs government buildings). Such organization of labels may provide for use of curated labels in training the model 406.

In some embodiments, the model 406 may work and/or interact with another model 414, which has been trained on different data and/or different user input. For example, the outputs of the model 414 may be used to verify the outputs of the model 406 and/or vice versa. The interactions of the models 406, 414 may provide for retraining of one of both of the models 406, 414. One of both of the models 406, 414 may be retrained based on additional information. For example, the model 406 may be retrained based on additional classifications of data. For instance, data from additional sensor(s) may be provided as input to train 404 the model 406.

The model 406 may provide a raster prediction 408 based on its training, which may result in outputting of feature vectors 410. The feature vectors 410 may provide for transformation of information in the pixel space to the geo-spatial space. That is, predictions made by the model 406 may be transformed into information on locations of objects based on identification of where the objects are depicted within images. The feature vectors 410 may be processed using filtering 416, which may remove one or more results based on one or more criteria. For example, certain portions of the feature vectors 410 indicating the depiction of a certain object (e.g., building) within an image may be filtered out based on the corresponding portions of the images having sizes and/or shapes that do not correspond to the size and/or shape of a building.

Image recognition processes may be implemented by other systems as well, including with the computing system described in U.S. patent application Ser. No. 16/128,266, filed on Sep. 11, 2018, which is herein incorporated by reference for all purposes.

FIGS. 5-27 illustrate example user interfaces in accordance with various embodiments. In various embodiments, the user interfaces may be accessed through a software application running on a computing device (e.g., computers, mobile phones, tablets, etc.) that includes one or more processors and memory. For example, the user interfaces may be accessible through a web browser. In another example, the user interfaces may be provided through a data analysis application. In yet another example, the user interfaces may be provided as a service over a network (e.g., software as a service). Depending on the computing device, the user may be able to interact with the user interfaces using various input devices (e.g., keyboard, mouse, etc.) and/or touch/gestures. The user interfaces are provided merely as examples and, naturally, the arrangement and configuration of such user interfaces can vary depending on the implementation. Thus, depending on the implementation, the user interfaces may include additional features and/or alternative features. The user interfaces may include/enable one or more functionalities of the interface(s) described above with respect to the components of computing system 102.

Some of the illustrations provided herein are presented in a military or conflict environment, but the application should not be limited as such and should be understood to provide illustrative examples for the ease of understanding. For example, the system can be implemented for any environment that can benefit from an assessment of a situation, including providing coordinated assistance or recovery to areas or individuals affected by a natural disaster (e.g., earthquake, hurricane, landslide, flood, fire, etc.), emergency response or support, terrorist attack, and the like. As a sample illustration with respect to analyzing past response plans in the natural disaster context, response plans implemented in response to an earthquake or other natural disaster situation may be analyzed to determine which response plans saved the most lives in the past and should be implemented in response to a future earthquake or other natural disaster with similar features. Thus, a determination or a suggestion of a response plan may be based, for example, on respective efficacies of previous response plans of a same type of situation, of an extent within a threshold range of the current situation. For example, if a current earthquake is of magnitude 5.5, previous response plans during earthquakes of magnitude between 5.0 and 6.0 may be reviewed and assessed to determine a current response plan. The review and assessment tools may be provided on a user interface. Alternatively, or additionally, the computing system 102 may also perform such review and assessment. The computing system 102 may, either alone or in conjunction with a different computing system, implement such a response, for example, by deploying resources (e.g., necessities such as water or food) to an affected location. The resources may include physical resources as mentioned above or electricity resources. Alternatively, the computing system 102 may transmit an indication to a different computing system to implement such a response.

Figure 5:
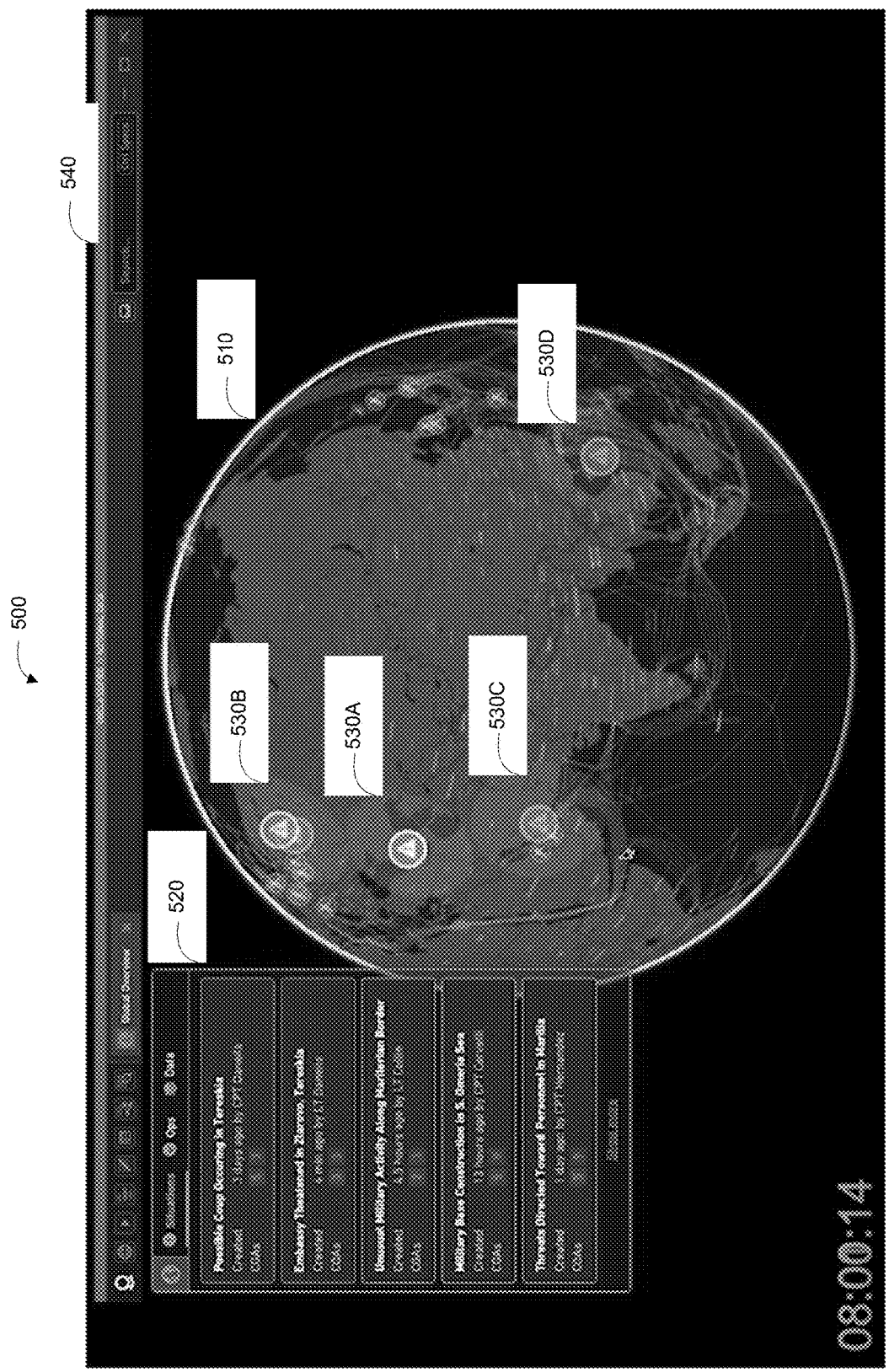
FIGS. 5-27 illustrate example interfaces for providing a data structure and user interface, in accordance with various embodiments.
Figure 5:
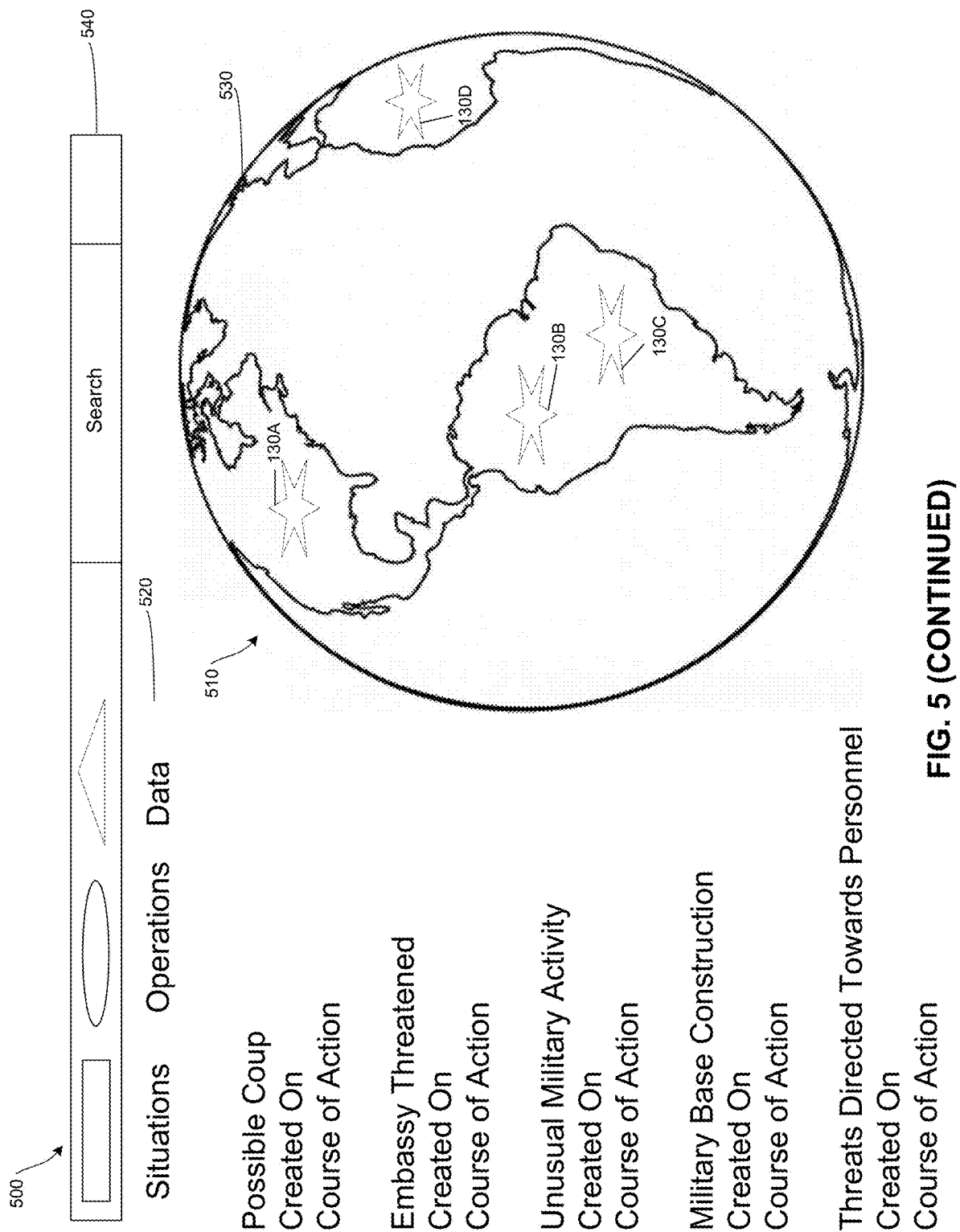

FIG. 5 illustrates a user interface for providing an assessment. User interface 500 includes geography overview 510, situation overview 520, and toolbar 540. In geography overview 510, a plurality of situations 530 are illustrated as first situation 530A, second situation 530B, third situation 530C, and fourth situation 530D. Each of plurality of situations 530 may correspond with a real-life or virtualized geographic location that is illustrated in geography overview 510.

Plurality of situations 530 may be received as a first data transmission of all "situation" data types available for the real-life or virtualized geographic location that is illustrated in geography overview 510. The first data transmission may include data for the plurality of situations 530. The first data transmission may include a description of the situation, creator of the situation, and/or one or more identifiers corresponding with a proposed course of action (COA).

Data corresponding with the first data transmission may be provided to user interface 500 and available for user selection. A second data transmission of a particular situation from plurality of situations 530 may be received in response to a selection of one of the plurality of situations 530, as illustrated in further detail with FIG. 7. The second transmission may include updated or more detailed information associated with the selected situation.

Each of the plurality of situations 530 may correspond with a geographic location. The geographic location may be included in geography overview 510. Geography overview 510 may correspond with geographic locations of a real-life or virtualized area. As illustrated, each situation 530 may correspond with a primary location that is identified by an icon overlaid on geography overview 510. The icon may be surrounded by other potential areas that may be affected by the situation 530, which may be illustrated as mask overlay on geography overview 510 that surrounds the icon. The primary location and other potential areas may be identified by data described herein (e.g., operational data determined by operational engine 116, etc.). The icon and mask overlay corresponding with the primary location of situation 530 can help identify, at a high level, the approximate location of each of the plurality of situations in the real-life or virtualized area.

The mask overlay on geography overview 510 that surrounds the icon may be altered. For example, a decay function may be applied to a transparency level of the mask overlay. The initial transparency level of the mask overlay may correspond with a first value (e.g., 50 percent transparent, etc.) and may increase transparency in accordance with the decay function over time. This may include, for example, an hourly or daily increase in transparency so that the boldest color for the mask overlay appears while events affecting the situation are received (e.g., via asset data, sensor data, etc.) and the mask lightens as the events become more stale.

Figure 6:
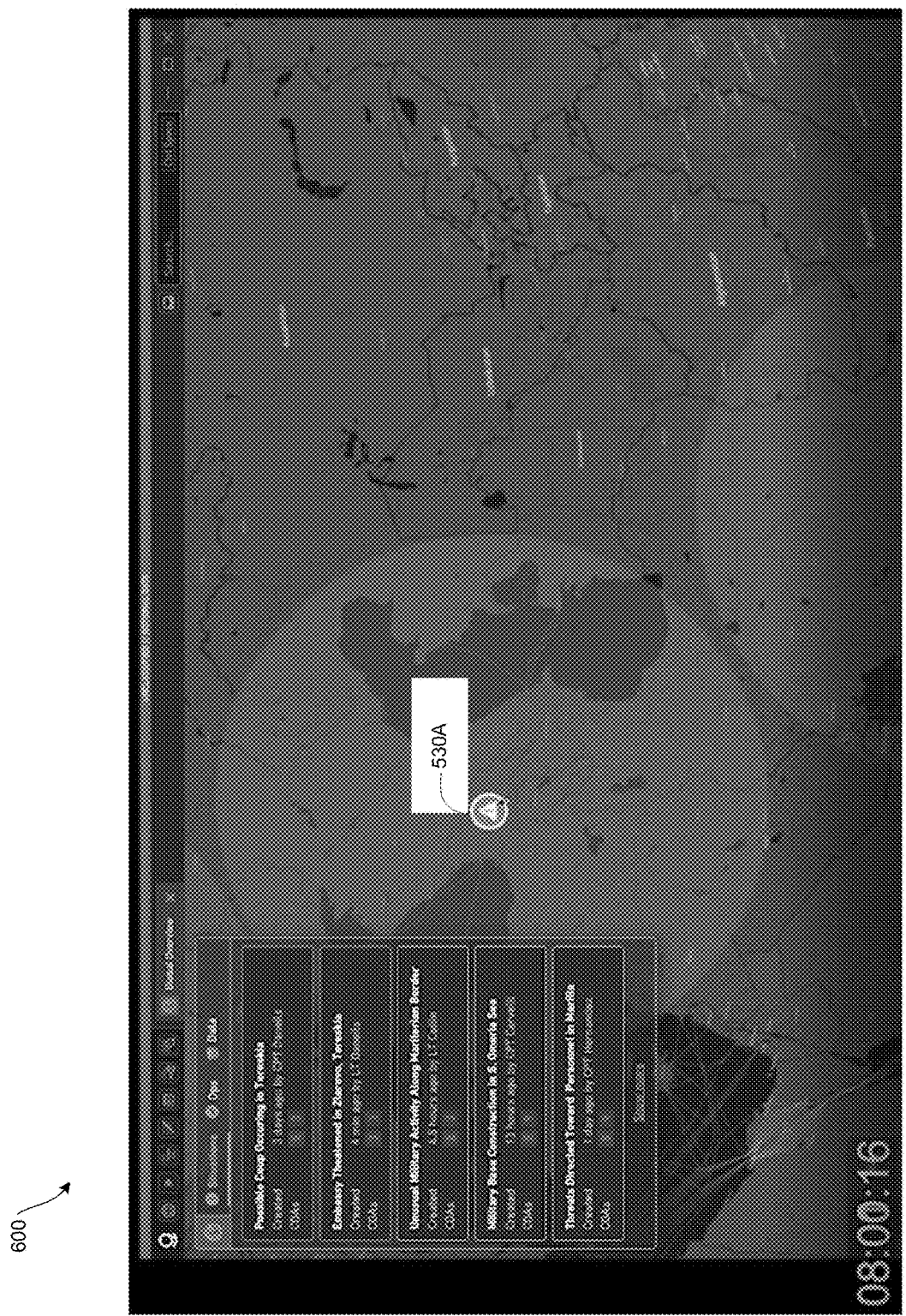
Figure 6:
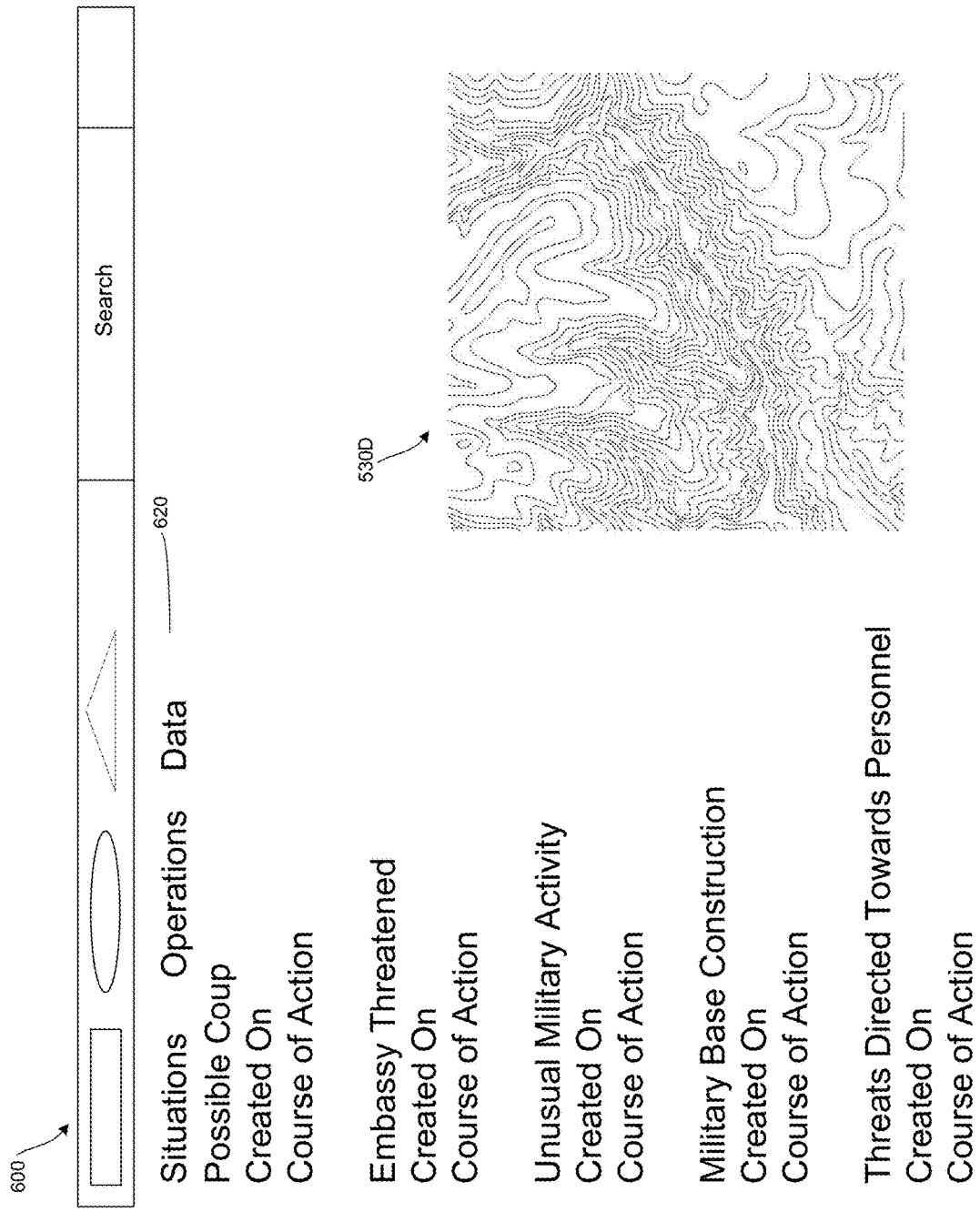
Figure 7:
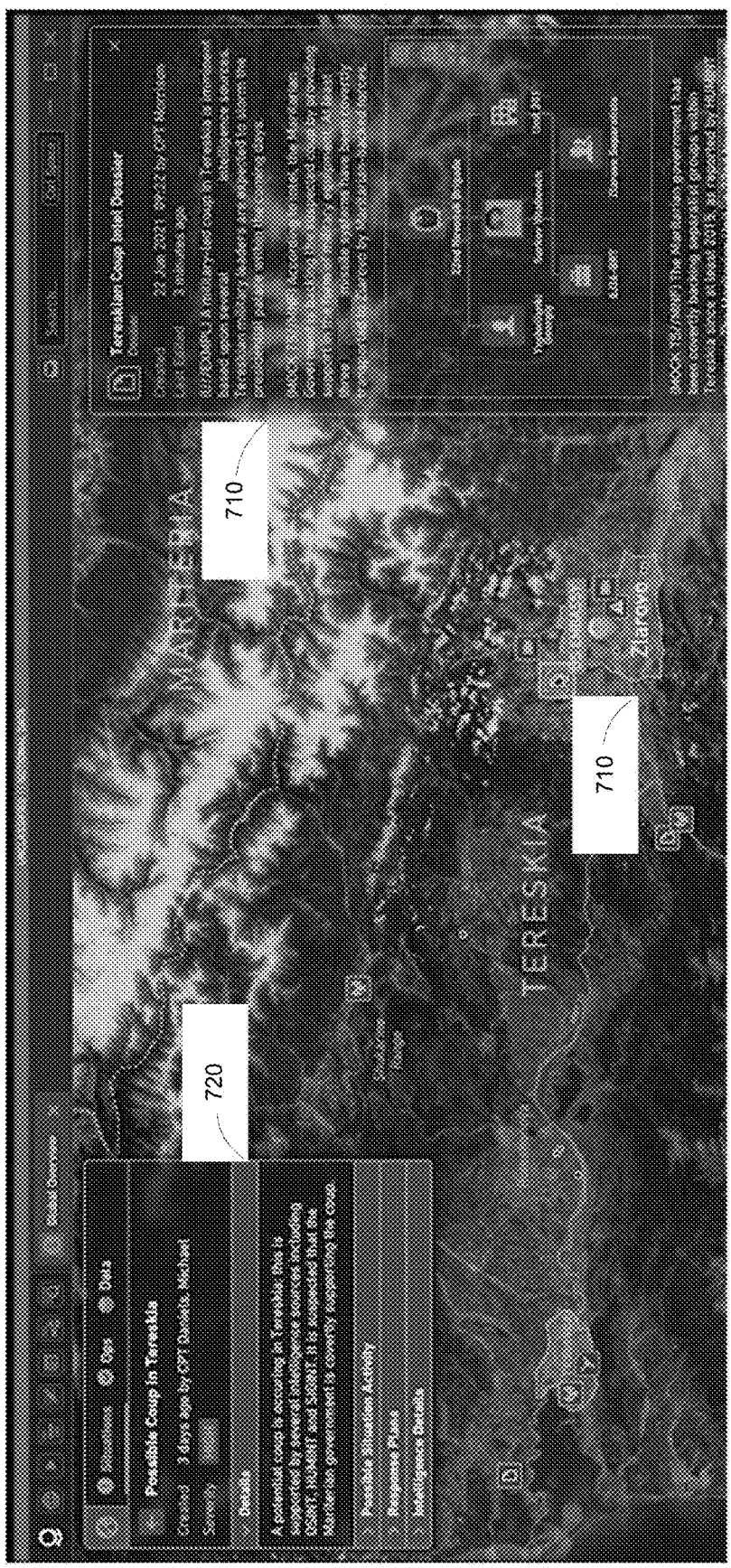

Interactions with geography overview 510 may be received and alter the area depicted, as shown in FIG. 6 and FIG. 7. Geography overview 510 may provide map navigation, search and filtering, information retrieval, and/or data manipulation. The interactions may include selecting, dragging, scrolling, pinching, tapping, zooming in or out, panning, rotating, adjusting the real-life or virtualized area to a particular orientation or angle, using tools (e.g., arrow keys, plus/minus buttons, etc.), and the like. In some examples, a user may select first situation 530A and geography overview 510 may zoom in to the geographic location corresponding with first situation 530A. A first level of data may be illustrated in FIG. 6. In first level zoom interface 600, other icons and masks associated with other, unselected situations 530 may be removed from geography overview 510 and the focus of first situation 530A may remain. A second level zoom may be illustrated in FIG. 7. In second level zoom interface 700, detailed information about first situation 530A may be added to the user interface.

In various embodiments, second level zoom interface 700 may provide data from data intelligence engine 112, asset engine 114, and/or operational engine 116 in association with first situation 530A. The data may be imported in a limited basis (e.g., via an application programming interface (API), etc.), including being limited to data in association with the geographic location of first situation 530A once the geographic location is selected. The data may be dynamically provided as an overlay in geography overview 510 of user interface. Icons (e.g., icon 710) may be added to geography overview 510 to identify the observations and data that is used to support the identification of first situation 530A in an assessment.

As further illustrated, user interface 700 may comprise detailed information about first situation 530A. The detailed information may comprise any data associated with first situation 530A, including intelligence data (e.g., sensors, human intelligence, data generated by user devices, etc.), asset data (e.g., description, skills, availability, etc.), operational data (e.g., real-time images, video, audio, etc.), and the like. Each of the observations and/or data sources may be associated with an icon, a geographic location, and other detail. In some instances, one or more icons 710 may be overlaid at user interface 700. Icon 710 may be a link to more detailed information associated with first situation 530A located adjacent to icon 710 at the user interface. The proximity of the location of the situation and icon 710 may allow for quick navigation and interaction between related information.

Figure 8:

An interaction may be received at icon 710 (e.g., select, tap, etc.) and portions of the user interface may be updated with detailed information, including first portion 810 and second portion 820, as illustrated with FIG. 8. These portions may be provided in one or more frame objects overlaid at user interface 700. For example, frame object illustrated in first portion 810 may include data specific to the situation associated with icon 710, including text, audio/video, or images of a particular document, analysis, dates/times, and the like. In second portion 820, the broad information associated with the plurality of situations 530 may be replaced with detailed information associated with first situation 530A and/or icon 710, including intelligence data, asset data, severity of the situation (e.g., a score in comparison with a threshold, etc.), and the like.

Portions of user interface may be displayed as a summarized list with access to additional information. For example, second portion 820 may include a summarized list of details, possible situation activity, response plans, and intelligence details. Additional information for each of these groups may be provided in response to a user interaction, such that the user interface may be updated to provide the additional information and data corresponding with each group. Prior to the user selection, second portion 820 of user interface may provide a high level overview of first situation 530A.

Figure 9:
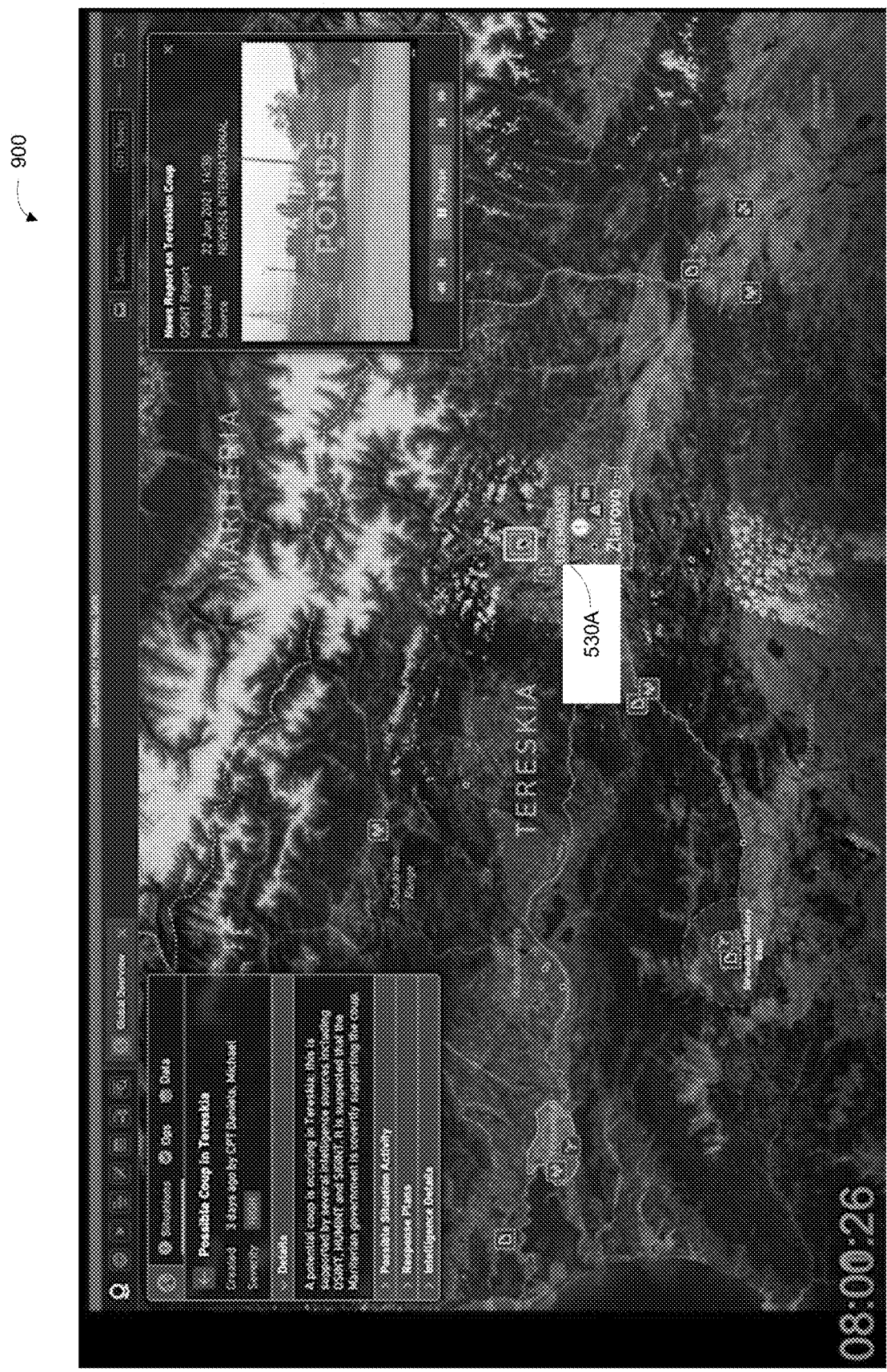

One or more objects may be selectable in first portion 810 and second portion 820 to provide additional information as well, as illustrated with FIG. 9. For example, when a user selects first portion 810 of user interface associated with a graph or other selectable object, additional information about a particular aspect of first situation 530A may be incorporated with first portion 810 and second portion 820, or provided as a pop-up frame object or other interface feature. In this illustration, a graph of related entities this provided. A user may interact with each of these icons to access additional information about the entity. The graph may also illustrate a hierarchy of entities associated with first situation 530A.

Returning to FIG. 5, user interface 500 also includes situation overview 520. Situation overview 520 may comprise a plurality of situations that are illustrated as individual objects in user interface 500. Additional data may be provided as well, including a description of the situation, creator of the situation, and/or one or more identifiers corresponding with a proposed course of action (COA). Each of the plurality of situations may correspond with a geographic location. The geographic location may be included in geography overview 510.

A summary of the situation may be provided in a frame object of situation overview 520 and may not be geographically displayed in geography overview 510, and vice versa, based on one or more constraints associated with either geography overview 510 or situation overview 520. For example, a threshold may limit a situation from being included in situation overview 520 and a geographic threshold may limit a geographic representation of the situation from being included in the geographic overview 510. As an illustrative example, a score associated with the situation may exceed a threshold to include the situation in situation overview 520. However, the score may be irrelevant in including a geographic location representative of the situation in geography overview 510. So the situation may be included in geography overview 510 but not situation overview 520. In another illustrative example, the situation may be included in situation overview 520 but not geography overview 510. The inclusion of the same situation in geography overview 510 may be reliant on the orientation or other geographic limitations of geography overview 510 that is displayed at the user interface and the corresponding geographic location of the situation.

User interface 500 may also comprise toolbar 540 used to search, filter, or interact with user interface to obtain less or more information provided in geography overview 510 and situation overview 520.

Figure 10:
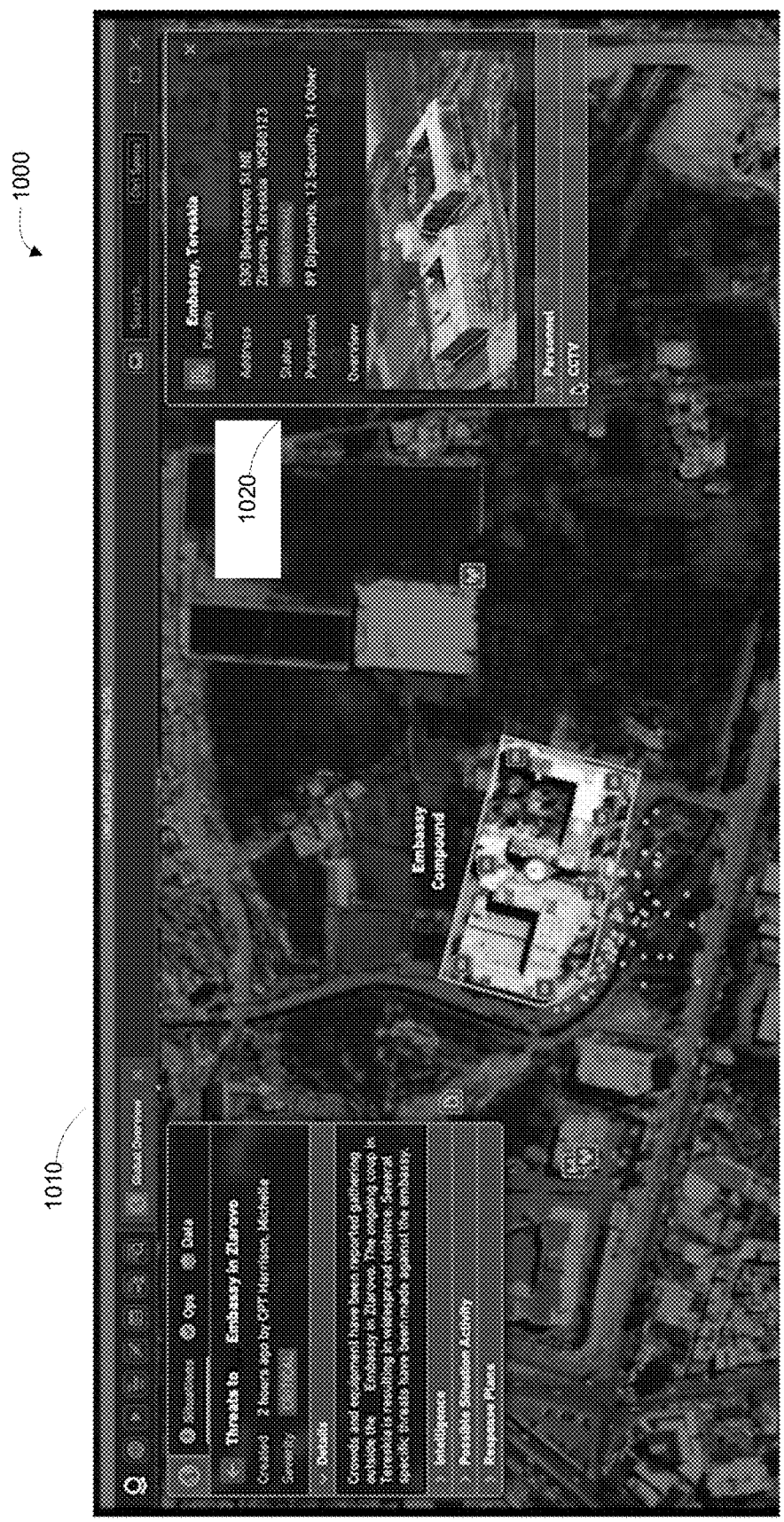

FIG. 10 illustrates a user interface for providing an assessment. User interface 1000 may comprise detailed information about first situation 530A, illustrated as one or more icons overlaid at user interface 1000, similar to icon 710 displayed with FIG. 7. When second icon 1010 is selected, detailed information may be presented in frame object 1020. In this example, detailed information in frame object 1020 may comprise real-time, streaming, or stored data associated with first situation 530A. Icon 1010 may provide a link to the detailed information in frame object 1020. A portion of the user interface may be replaced to present the detailed information in frame object 1020.

Figure 11:
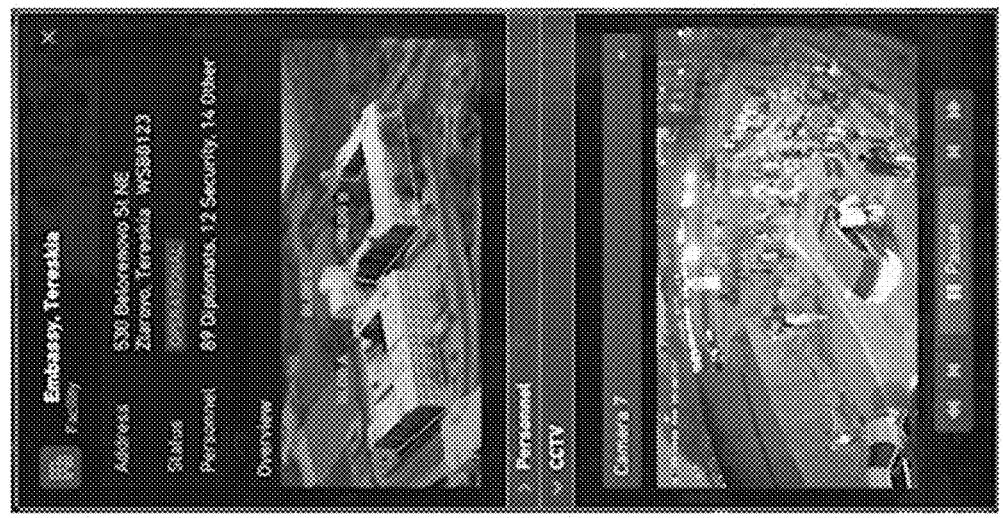
Figure 11:

FIG. 11 illustrates a user interface for providing an assessment. User interface 1100 may comprise a further enhanced or detailed image of first situation 530A, including an image corresponding with the geographic location of first situation 530A in the main display area (e.g., operational data). In some examples, this interface may be beneficial for identifying real time information associated with the geographic location in order to dynamically assess dangers or hazards for the location.

Figure 12:
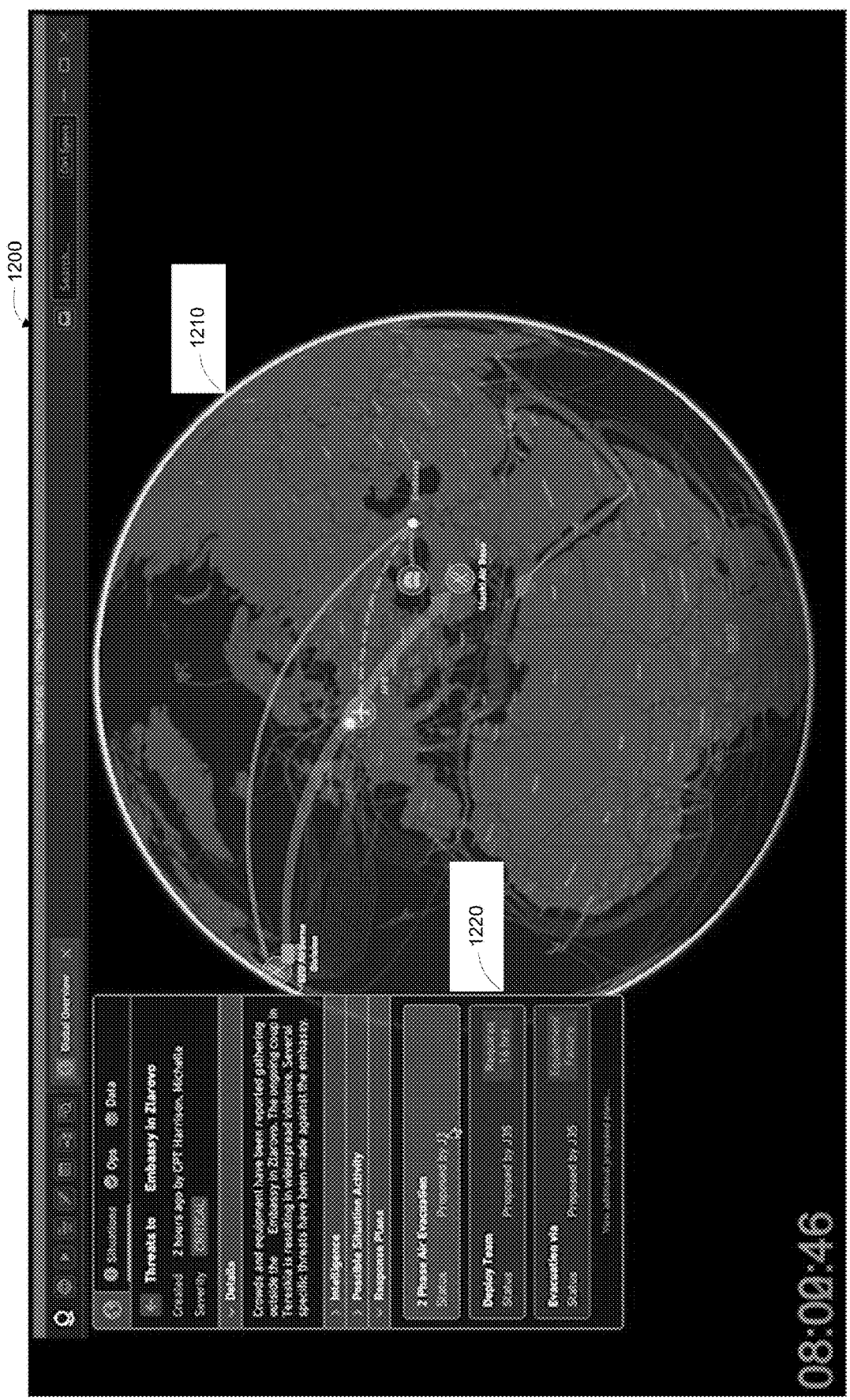

Additional or alterative data may be provided in one or more portions 1110 of the user interface as well, including a building address, personnel located at the building, real-time, streaming, or stored data associated with the location, or other information (e.g., asset data, operational data, etc.). Alternative embodiments of portions 1110 are illustrated in FIG. 12. For example, interactions with user interface 1100 may alter the user interface to include a first interface portion 1210 that comprises personnel data, which may include personnel names, titles, images, or other information. In another example, a second interface portion 1220 may comprise real-time, streaming, or stored data associated with first situation 530A.

Figure 13:
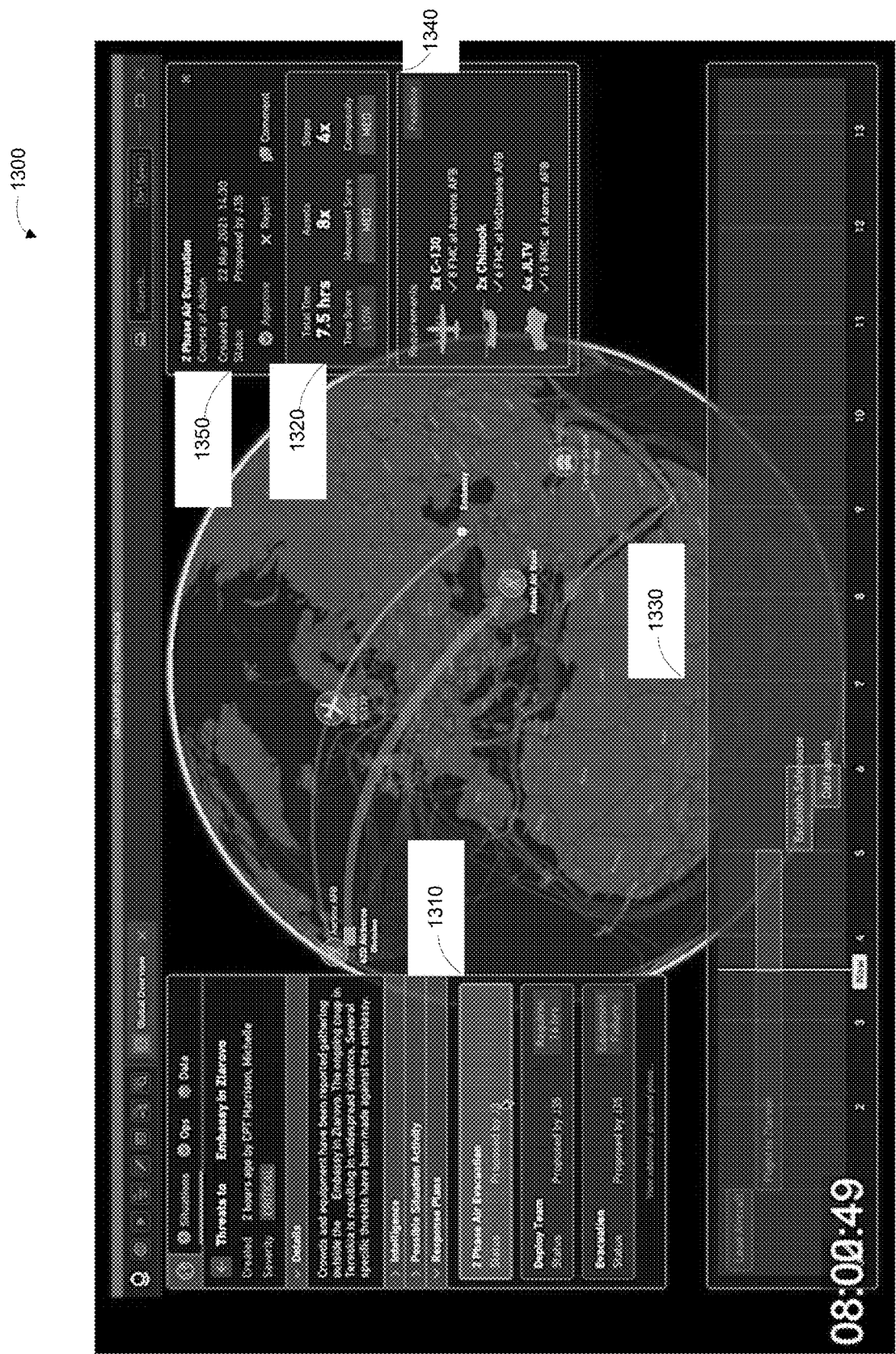

FIG. 13 illustrates a user interface for providing an assessment. User interface 1300 may provide a plurality of response plans in first portion 1320 of user interface 1300 and illustrative geographic locations in a geography overview 1310 corresponding with each of the plurality of response plans. In the illustration provided, the plurality of response plans include a two-phase air evacuation process, deploying a team from a first location, and evacuating a team via a particular asset such as an aircraft or vehicle from a second location. A geographic location corresponding with each of the plurality of response plans (e.g., the evacuation location, the first location for deployment, the second location, etc.) is identified as an icon and travel path in geography overview 1310.

Each of the plurality of response plans may correspond with one or more scores that may be used to generate an overall score. For example, a number of assets (e.g., humans, planes, trucks, equipment, etc.) may correspond with a first score (e.g., asset count score) and an amount of time needed to implement the response plan may correspond with a second score (e.g., time score). Each of the scores may be compared with a threshold value (e.g., to identify a high or low score) or may be applied to a standard deviation to identify an outlier. One or more of these scores may be identified as an outlier in a standard deviation of scores corresponding to the plurality of response plans, and the score may affect the overall score for the response plan disproportionately from the other scores.

In some examples, the comparison with the threshold value and/or output of the standard deviation may be identified as flag 1330 in first portion 1320 of user interface 1300. As a sample illustration, a time score for a subset of the plurality of response plans may correspond with a time range of ten and fifteen hours to implement the subset of response plans while a second response plan may correspond with a time range of more than twenty hours to implement. The time score of the second response plan may be an outlier in the standard deviation of time scores and correspond with a higher score than the subset of response plans.

The score may be used to filter and sort response plans from first portion 1320 of user interface 1300. For example, the response plans with the lowest scores may be provided in first portion 1320 of user interface 1300, while the response plans with the highest scores may be removed from first portion 1320 of user interface 1300. The number of response plans provided in first portion 1320 may be limited to a threshold value (e.g., top three response plans, etc.).

Figure 14:

FIG. 14 illustrates a user interface for providing an assessment. In this illustration, a plurality of response plans are provided in a first portion of user interface 1400. One or more of the plurality of response plans may correspond with flag 1330 to identify a score (e.g., time score, complexity score, overall score, etc.) that exceeds a threshold (e.g., in view of a threshold value, or in view of a standard deviation of scores corresponding with all response plans, etc.). Flag 1330 may identify the score that exceeds the corresponding threshold to alert the user to a potential issue with the particular response plan, absent any user selection of the response plan.

A user may select first response plan 1410 from the plurality of response plans, and in response to the selection, additional data associated with first response plan 1410 may populate user interface 1400. Additional data may be added, for example, to second portion 1420 and visual icons and/or travel path in the geography overview of user interface 1400. Second portion 1420 of user interface 1400 may also comprise one or more scores (e.g., time score, movement score, complexity score, etc.), or more detailed data associated with each of the scores used to generate the score (e.g., "7.5 hours" vs. a "low" time score, "8×number of assets above a threshold" vs. "medium" movement score, etc.). This may include, for example, an estimated time, number and type of assets, and number of steps estimated to complete the response plan.

In some instances, second portion 1420 of user interface 1400 may assess the feasibility of first response plan. For example, the response plan may require particular assets to implement the action steps in the response plan, including certain aircraft and/or vehicles. Asset data may be accessed to identify if these assets are currently available at the geographic location associated with first response plan, or if the assets can be transported to the geographic location (with added action steps, time, and assets to operate these vehicles, etc.). When the accessibility of these assets is above a threshold value (e.g., based on the time score, movement score, complexity score in comparison with each threshold value, etc.), the feasibility of the overall response plan may be provided in feasibility frame object 1440 as "true" or "feasible." Otherwise, assets may be missing to implement the response plan and the feasibility of the overall response plan may be provided in feasibility frame object 1440 as "false" or "infeasible."

Figure 20:
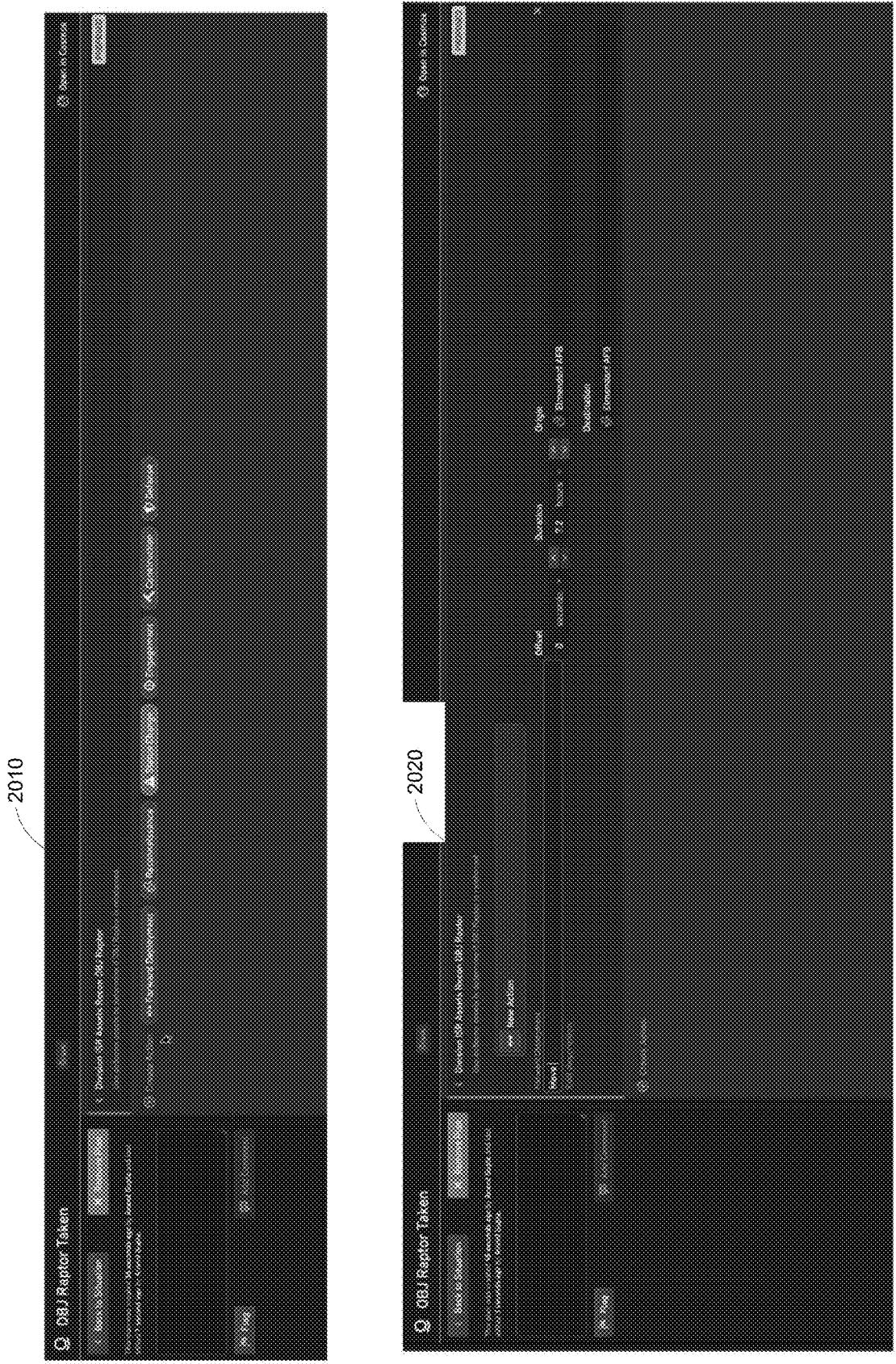

Feedback may be requested and/or received at fourth portion 1450 of user interface 1400. For example, a first user may select first response plan 1410 and provide a suggestion to change one or more action steps or assets required to implement the response plan. The feedback may identify the requested changes to the response plan, and may be transmitted to a second user for review. The second user may approve of the changes to the response plan (e.g., using the "approve" tool at fourth portion 1450), and any changes to the response plan are updated in user interface 1400. Additional actions may correspond with the approval of the response plan, including generating and transmitting an electronic message from computing system 102 to initiate implementation of the approved response plan. In some examples, the feedback may be transmitted to the response plan user interface as illustrated in FIG. 20 for revisions.

Action steps associated with first response plan 1410 may be displayed in third portion 1430 of user interface 1400 as well. For example, a Gantt chart may be used to identify the action steps in association with a timeline and displayed in third portion 1430 of user interface 1400. A current time identifier may illustrate a progression of the response plan in association with the actions. The current time identifier may dynamically move across user interface 1400 and align the current action step being implemented at the current time. Each action step, estimated time to complete the action step, and current time identifier may be dynamically updated in third portion 1430 of user interface 1400 as additional information is received.

Figure 15:
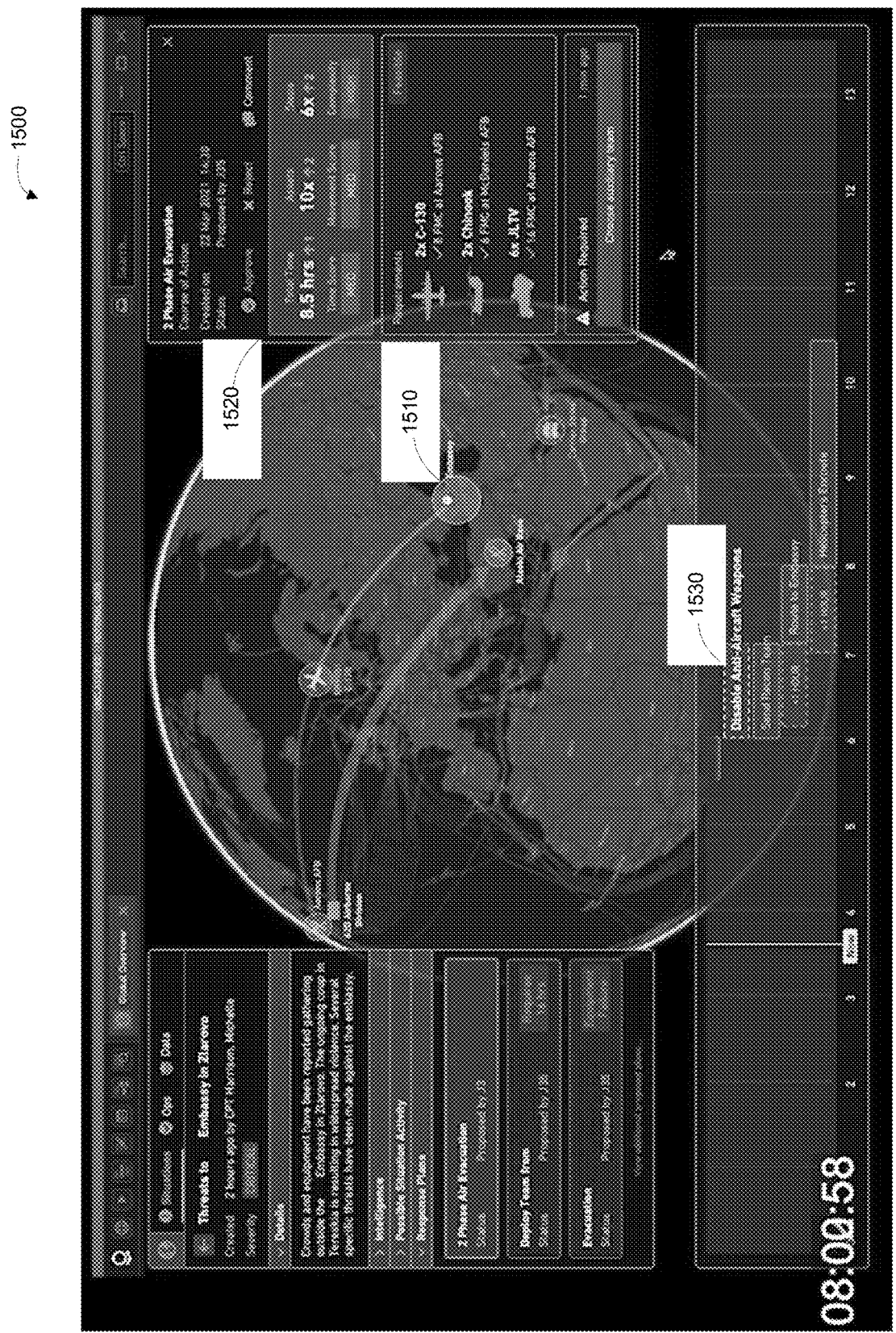

An example of dynamically updating user interface 1400 is illustrated in FIG. 15. As additional information is received (e.g., triggered via image recognition or broad area search, etc.), a new frame object 1510 is added to user interface 1400 to identify the additional information associated with first response plan 1410. A selection of frame object 1510 may be received. Upon activation, additional information may be incorporated with existing portions of user interface 1400, or provided as a pop-up frame object 1520 or other interface feature. A user may interact with frame object 1520 to access the additional information.

In this illustration, images are captured in association with the geographic location of first response plan 1410 and compared with a data store of known images and corresponding scores (e.g., a first vehicle type is associated with a score of 100 while a second vehicle type is associated with a score of 50, so the first vehicle type has a greater score when identified in an image, etc.). When an item identified in the captured image corresponding with a score exceeding a threshold value, frame object 1510 is generated. Frame objects 1510, 1520 may be populated with the images captured (e.g., real-time, streaming, static image, etc.), score, and additional information associated with the known image from of the data store (e.g., specifications of a vehicle or weapon, range, location that the image was captured, etc.). Frame objects 1510, 1520 are provided at user interface 1400.

Figure 16:
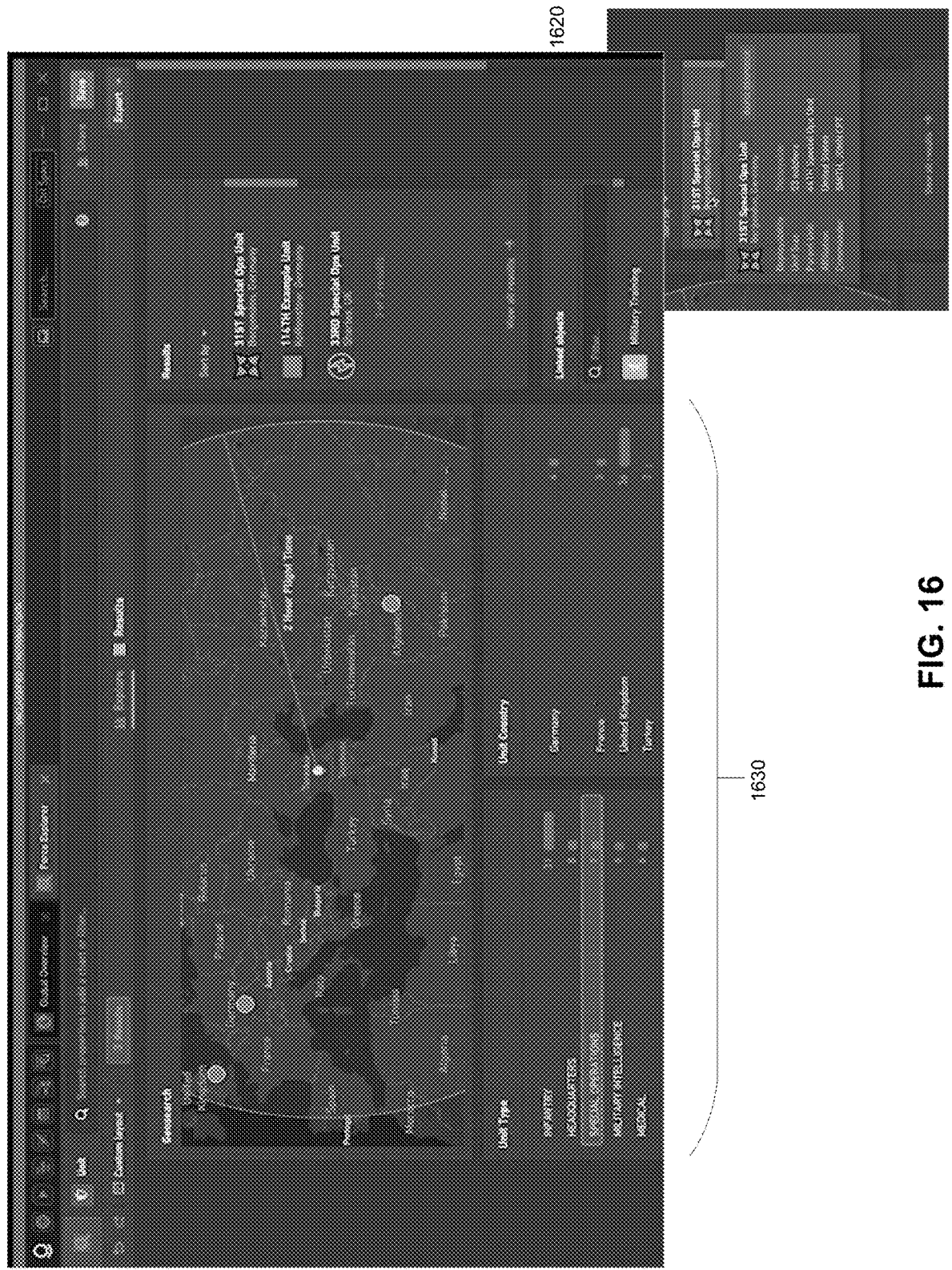

With the additional information, first response plan 1410 may be updated, as illustrated in FIG. 16. Updates may be implemented in various portions of user interface based on the data received. For example, geography overview 1610 may be updated when the data correspond with a particular location (e.g., using an icon or mask overly to identify the change, etc.). When the updates affect one or more scores, second portion 1620 of user interface 1600 may also be updated (e.g., illustrating an increase in time, number of assets required, or action steps for the updated response plan, etc.). When additional steps are added to the response plan, third portion 1630 of user interface 1600 may also be updated (e.g., by adding additional steps or increase in time required in the Gantt chart, etc.).

Each of these updates illustrated with user interfaces 1600 may be highlighted in a common color to show changes to the response plan. For example, any changes to the response plan may be provided in a yellow transparent mask, icon, or font to correlate the dynamic changes to each other.

Figure 17:
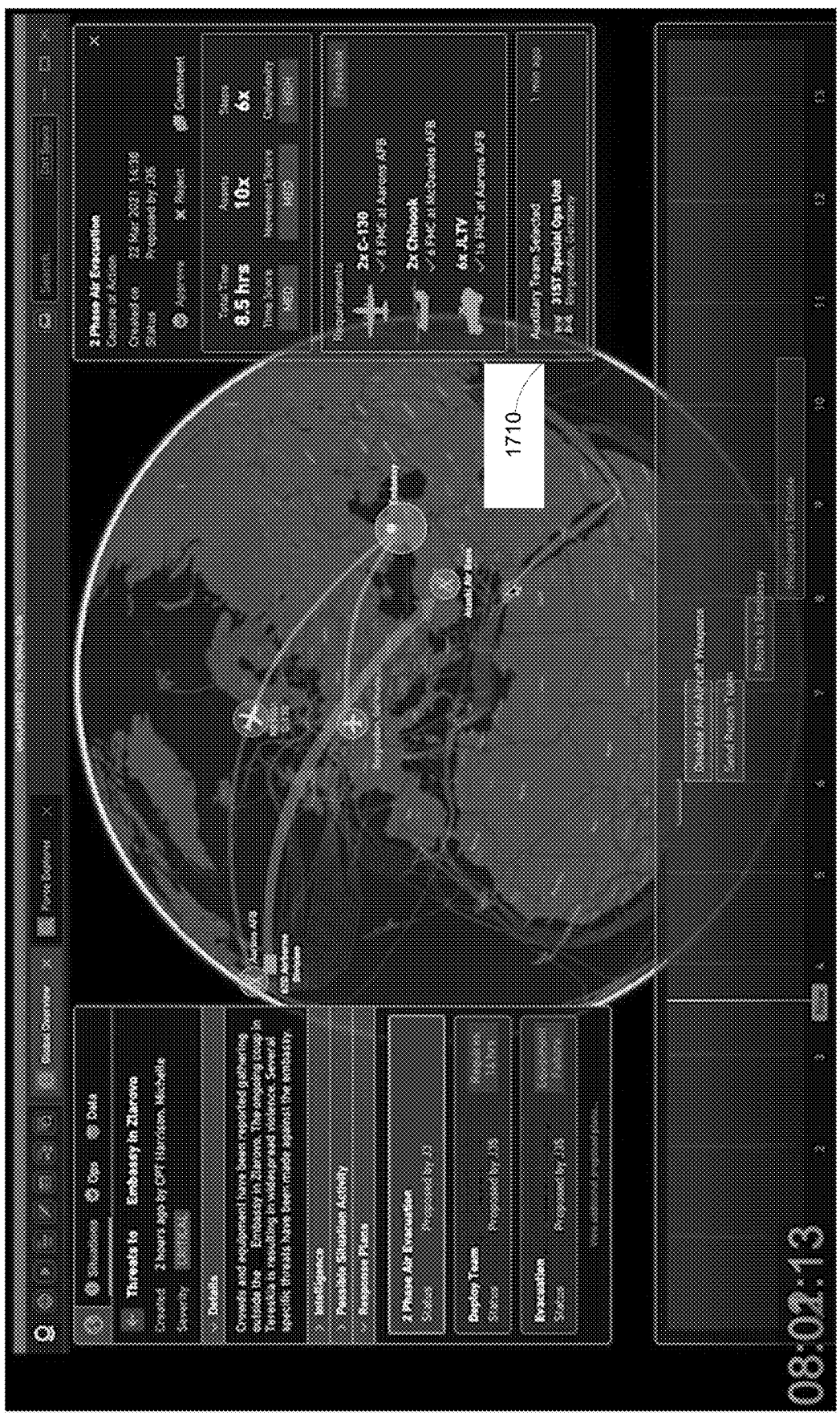
Figure 18:
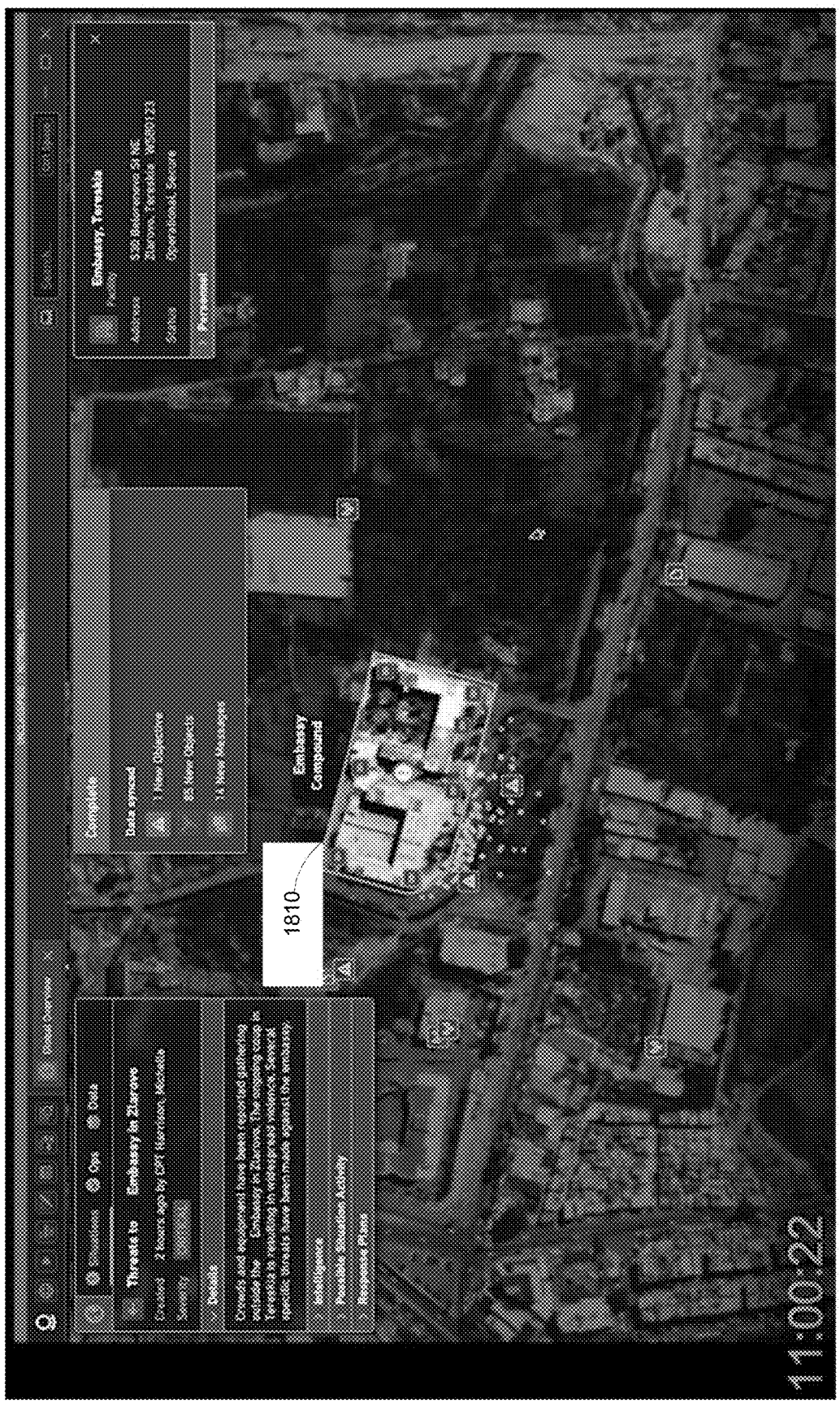
Figure 19:
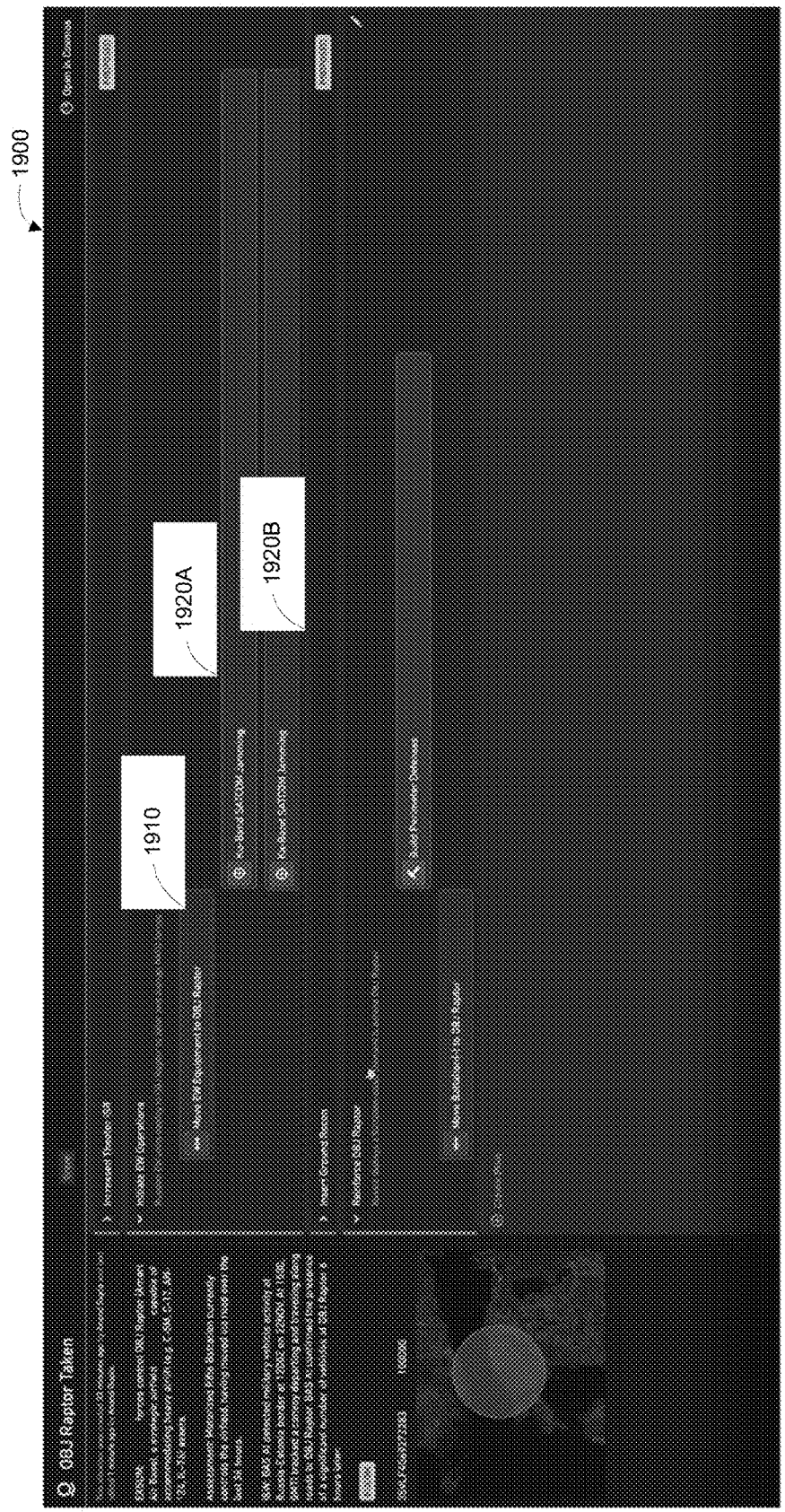

FIG. 17 illustrates a user interface for providing an assessment. In this illustration, asset data may be provided. The asset data may be selected and filtered in accordance with the selected response plan. For example, a geography overview associated with the selected response plan and a plurality of asset teams that can implement the selected response plan may be provided in first portion 1710 of user interface. A selection of an asset team may provide additional information that can be incorporated with existing portions of user interface, or provided as a pop-up frame object 1720 or other interface feature. A user may interact with frame object 1720 to access the additional asset data about the asset team (e.g., availability, unit size, parent unit, affiliation, commander name, etc.).

Various types of asset teams may be displayed and filtered in second portion 1730 of user interface. For example, asset data may be filtered based on unit type, geographic location, or other information that may be used to limit or restrict the available asset teams that may implement the response plan.

A particular asset team may be selected to implement the response plan. For example, a user may select the asset team from user interface and the selected asset team may be identified in an updated portion 1810 of the user interface, as illustrated with FIG. 18. The user interface may continue to be dynamically updated as more information is received.

Additional actions may correspond with the selection of the asset team. Prior to deployment of the selected asset item, approvals by certain officers, supervisors, and/or reviewers, for example, via an interface, may be required. For example, upon selection, an automated electronic message may be transmitted from computing system 102 to initiate movement of the asset team to a geographic location associated with the response plan. Data may be synchronized with computing devices associated with the response plan and identified in an updated portion 1910 of the user interface, as illustrated with FIG. 19. In other examples, current location data of the asset team may be stored with computing system 102 (e.g., asset engine 114) and/or the availability of the asset team may be updated from "inactive" to "active" (e.g., in asset data, etc.) to remove the asset team from implementation of other response plans or movements to other geographic locations.

In some embodiments, a selection and/or modification of a response plan, along with contextual data and outcomes associated with the selection and/or modification may be provided as an input and/or feedback to a machine learning model that determines any of the scores, for example, by the score engine 120. For example, the machine learning model may determine any of the scores based on similar historical situations. In one scenario, if a commercial vessel has been hijacked by pirates, the machine learning model may determine any of the scores using a weighted average of scores from previously similar situations. Weights of the scores may be determined based on an extent of similarity of the previously similar situations, outcomes of the previously similar situations and/or based on a frequency of outcomes in the previously similar situations. In one example, the weights of the scores may be adjusted to be higher if an outcome was successful, and/or if a rate of success in these previously similar situations is high. In one particular example, if a commercial vessel is being hijacked by pirates, the machine learning model may determine scores based on previously similar situations having a similar location and extent of attack.

FIG. 20 illustrates a user interface for providing an assessment. In this illustration, a response plan may be generated or updated through user interface 2000. For example, response plan 2010 may comprise a plurality of action steps 2020 (illustrated as first action step 2020A and second action step 2020B) associated with a situation data type. The action steps may be grouped to correspond with a response plan to the situation, one or more locations where the response plan will take place, assets/equipment involved in the response plan, and/or the type of action being performed. In addition to groupings by response plan 2010, the groupings of plurality of action steps 2020 may correspond with similar user interface features to illustrate the common actions in the response plan (e.g., same color, icon, etc.).

In some instances, a location of an asset may be automatically identified. For example, asset data may be accessed to identify the human operators, equipment, vehicles, and the like that are available and located within a threshold distance to the location of the resource plan. These assets may be provided at the user interface as options to include with the response plan. In some examples, the assets may be automatically associated with the response plan as a best choice option.

Figure 21:

User interface 2000 may include one or more options to add a step to the response plan, remove a step from the response plan, and/or rearrange the existing steps of the response plan. Generation of action steps for a response plan is illustrated in FIG. 21. For example, using first interface 2110, the user may select (e.g., type, speak, select, etc.) a type of action step to create a new action. One or more predetermined parameters may be associated with each type of action step. Illustrative options are forward deployment, reconnaissance, status change, engagement, construction, or defense, although other options for action steps may be provided as well without diverting from the scope of the disclosure. For example, a "defense" action may automatically include building a perimeter fence and creating a safe area within a geographic location of the response plan. A user may interact with one or more of the parameters to set, change, remove, and/or otherwise modify the parameters.

Using second interface 2120, the user may provide additional details for the action step. Illustrative options include a description of the action, offset (e.g., an amount of time needed prior to initiating the step, an amount of time to move an asset to a different location, an amount of time for preparing to initiate the step, etc.), duration (e.g., an amount of time needed to complete step, etc.), originating geographic location, and the like. The additional details may be automatically populated as well (e.g., a predetermined offset time duration that the asset will need to move from a current location to a new location, etc.). Similarly as with types of action steps, other options for additional details may be provided as well without diverting from the scope of the disclosure.

Figure 22:
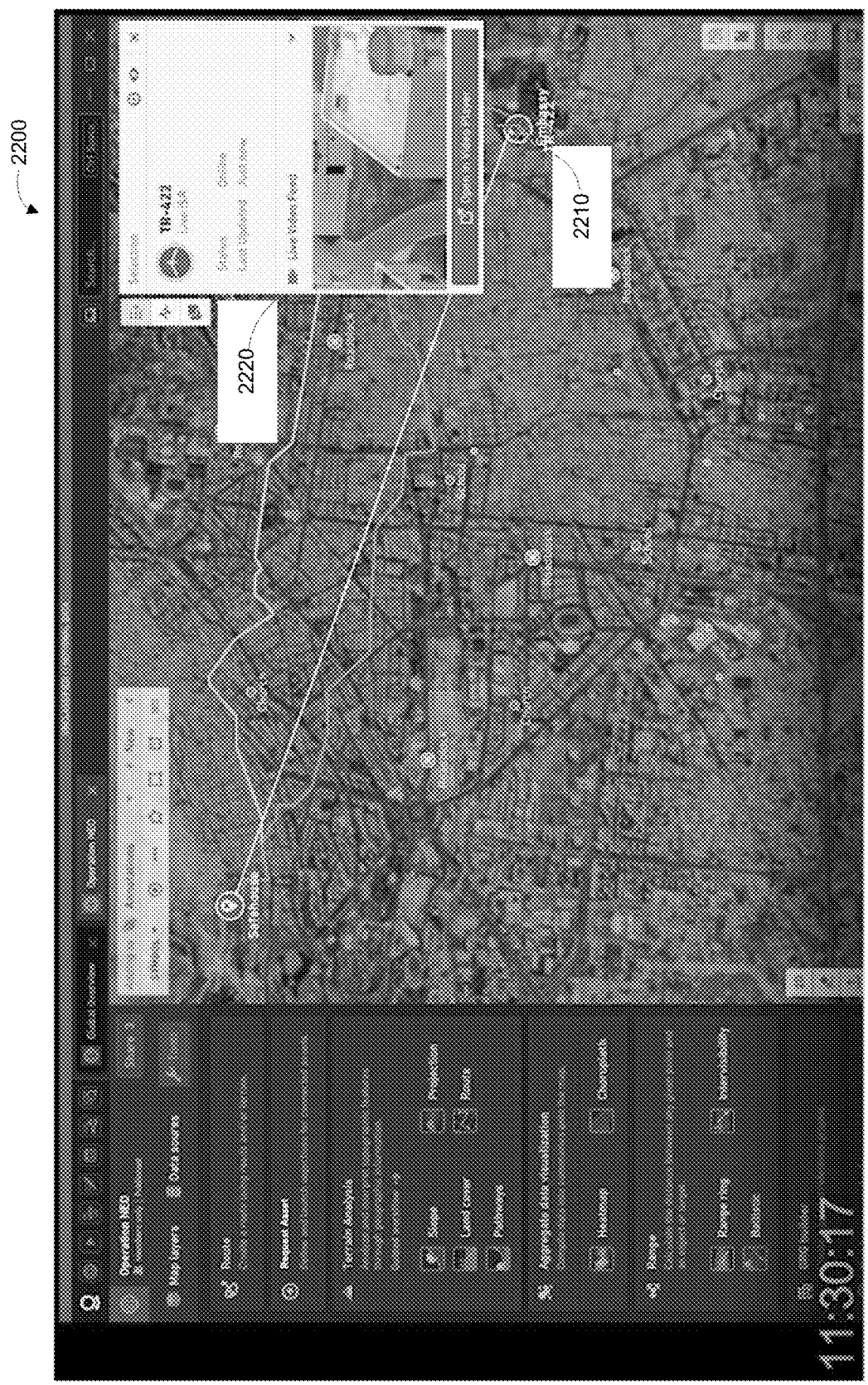

FIG. 22 illustrates a user interface for providing an assessment. User interface 2200 is dynamically updated to identify a current status of each aspect of the response plan. The data may be updated based on a positioning system (e.g., GPS, etc.) that can track the location of an asset in real-time, or other sources of data including, for example, sensor data, human intelligence data, asset status data, and/or operational data. Corresponding icons may move in accordance with the data. The predicted geographic path of the response plan may also be provided in the geographic summary to help visually show the status of the asset along the predicted path.

As illustrated, two response plans 2210 (illustrated as may be first response plan 2210A and second response plan 2210B) are provided concurrently in the geographic summary portion of user interface 2200. When more than one response plan 2210 is provided, as illustrated, the response plans may be grouped using similar colors to identify particular or geographic locations actions corresponding with the respective response plan. When icons or mesh overlay are used, these user interface features may be color-coded to the corresponding response plan as well (e.g., user interface features corresponding with Response Plan A are blue, user interface features corresponding with Response Plan B are yellow, etc.).

Interactions may be received with each of the items to access additional information. As illustrated, a user may select an icon of an asset (e.g., unmanned aerial vehicle (UAV), etc.) to access additional information associated with the past, current, or future geographic location of the asset. The additional information may be incorporated with existing portions of user interface, or provided as a pop-up frame object 2220 or other interface feature.

Figure 23:
Figure 24:
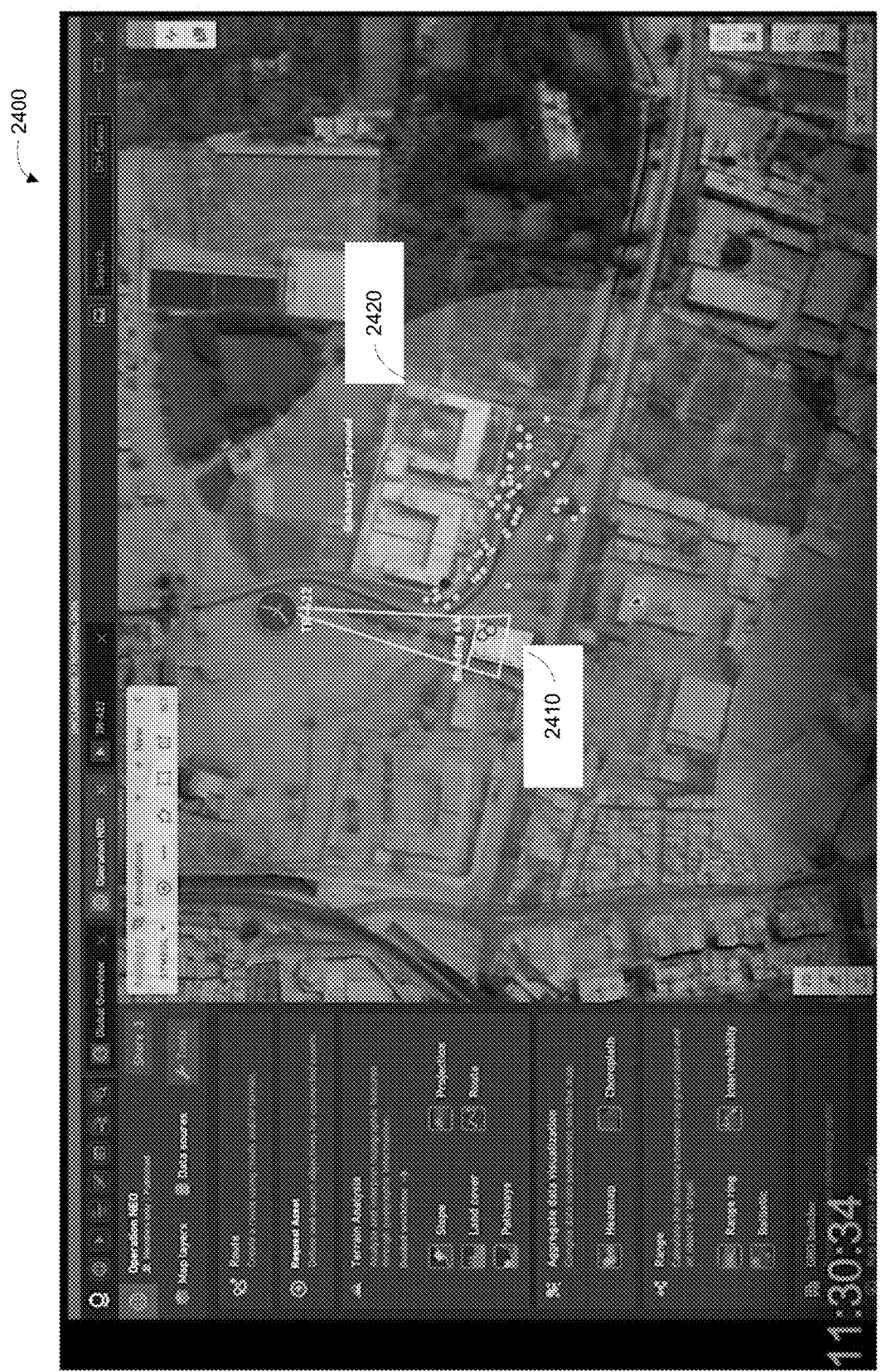

FIG. 23 illustrates a user interface for providing an assessment. User interface 2300 is dynamically updated at trigger points as well, including at the beginning of a response plan or the end of the response plan. The trigger may be identified in association with the last action step for the response plan and/or the time that the response plan is predicted to conclude. As illustrated, asset 2310 may reach the destination location and a streaming video may automatically appear in a frame object 2320 in a portion of user interface 2300. When an interaction with the frame object 2320 is received, a larger image or video may be provided as an overlay on user interface 2300, as illustrated in FIG. 24.

As illustrated in user interface 2400, objects may be identified in the overlay. For example, people may be identified through image recognition (e.g., matching an object in the video with a known shape into a data store, etc.). The user interface may be updated with a box 2410 or other shape object to identify the people, for example, to highlight their location in the video. Geographic locations 2420 may be updated as well, as shown by a digital arrow facing a direction of a building location in the real-life or virtualized geographic location.

Figure 25:
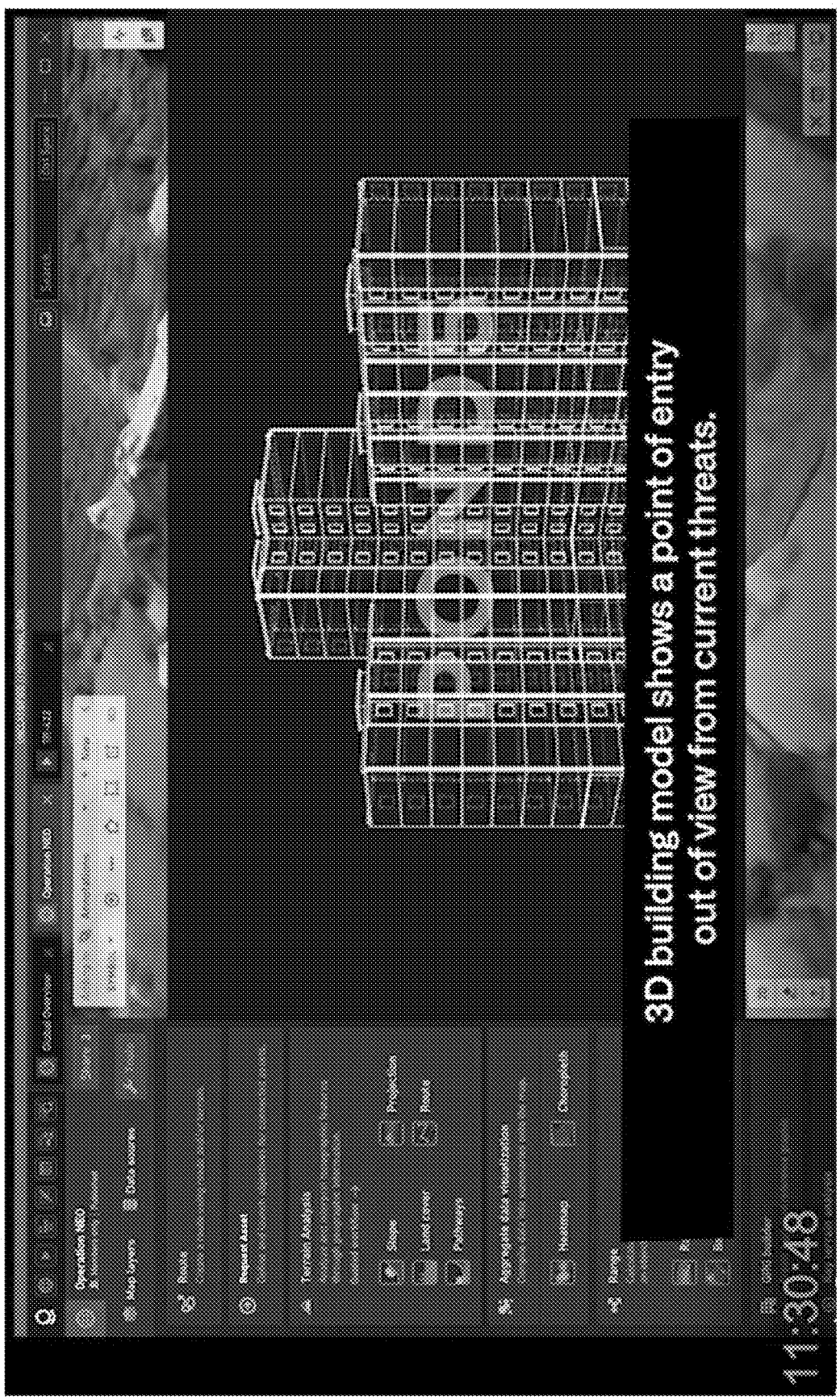

FIG. 25 illustrates a user interface for providing an assessment. User interface 2500 may comprise a visibility analysis of an asset at a geographic location. The visibility analysis may illustrate areas where assets at a particular location are able to view from the location. As illustrated, individuals located at building 2510 may have limited visibility to areas that are blocked by buildings or other structures. User interface 2500 may be updated to show the areas that are visible and not visible by individuals located at building 2510, for example, by highlighting visible areas in green and non-visible areas in red.

In some examples, a geographic area may be defined with the non-visible areas and additional information may be retrieved in association with buildings or other objects that are located in those non-visible areas. In one example, building 2520 is blocked from view from individuals located at building 2510. Additional information may be retrieved in association with the building, including a three-dimensional (3D) model of the building and any point of entry out of view from the individuals located at building 2510.

Figure 26:
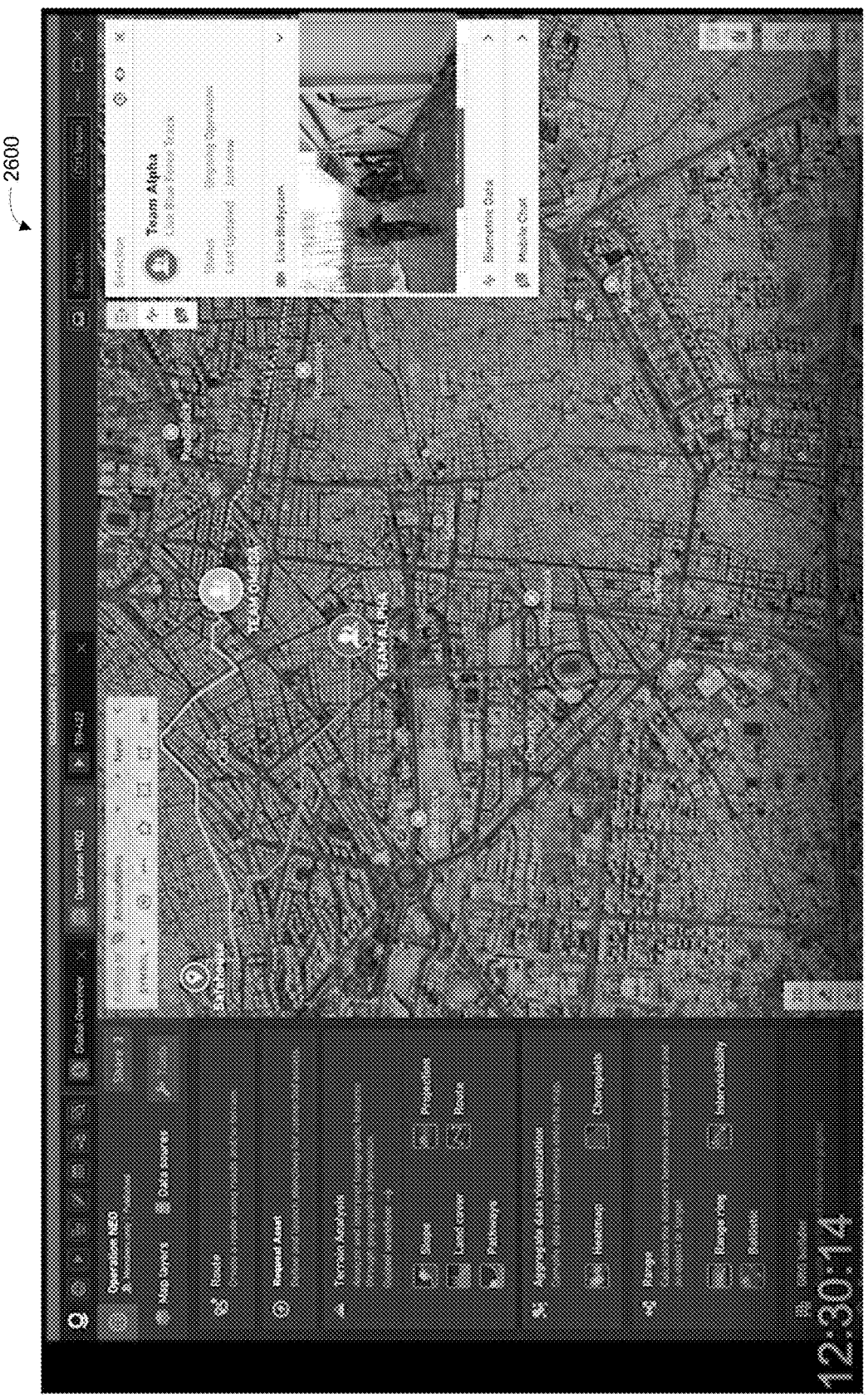
Figure 27:
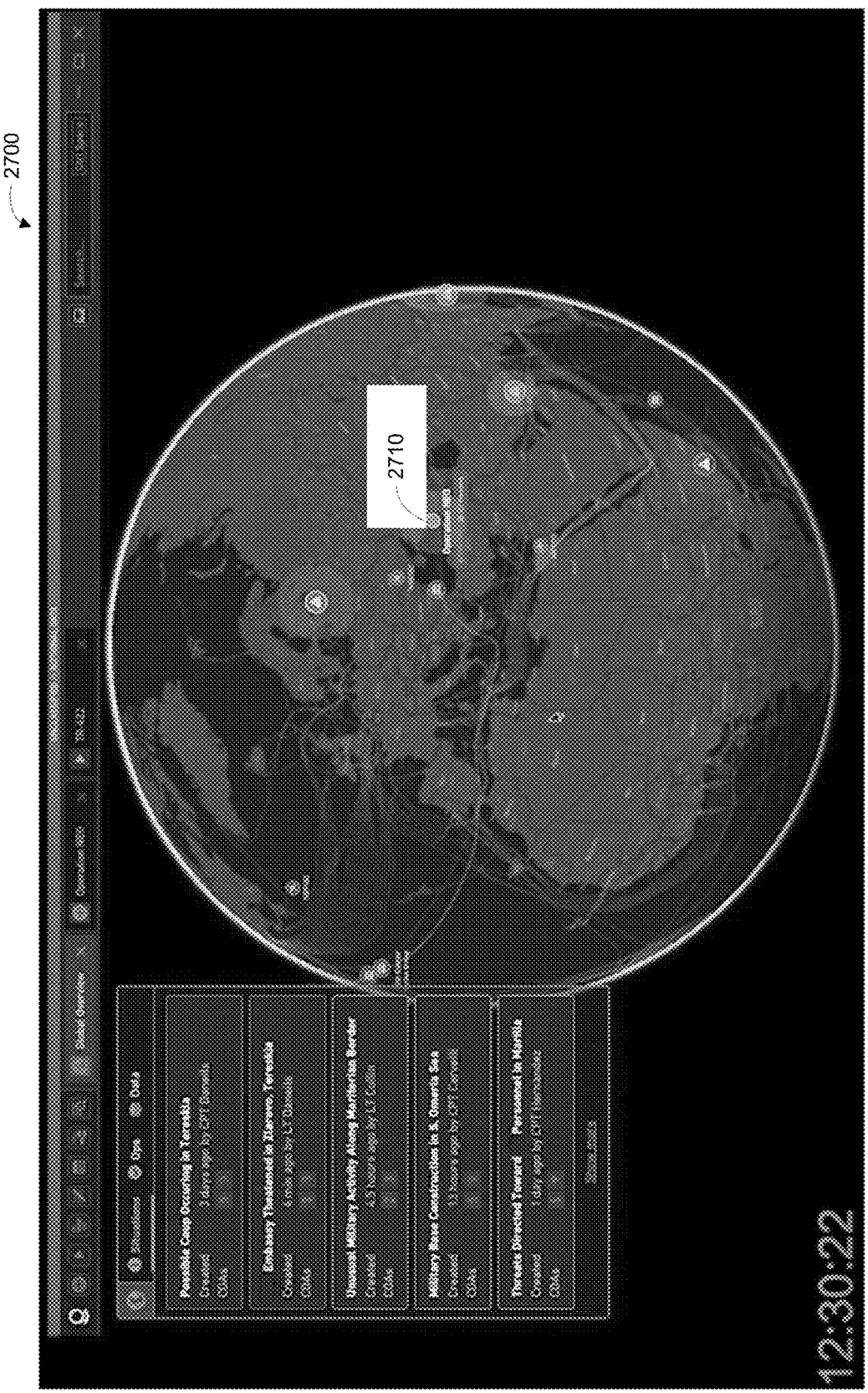

Additional actions may correspond with actions performed under the response plan, as illustrated in FIG. 26. For example, electronic message 2610 may be generated to include data associated with the response plan, including the response plan name, purpose, description, assets, or other information. Electronic message 2610 may be transmitted from computing system 102 to distribute the data to identify computing devices operated by personal. Additionally, FIG. 27 illustrates additional data that may be dynamically updated at user interface 2700, including images or video received from assets as they are completing the response plan. The additional data may be provided as an overlay to a geographic map or in a portion of user interface 2700 while geographic locations of assets are tracked and updated.

FIG. 27 illustrates a user interface for providing an assessment. User interface 2700 may be updated to illustrate a status of a situation in response to a completed response plan. For example, geographic location 2710 identifying the situation associated with first response plan may be updated from a red icon with a red mask overlay to a blue icon with a blue mask overlay, or other similar indication of a non-urgent situation with respect to a threshold value. Other situations in other geographic locations provided with user interface 2700 may remain unchanged or updated in response to other data sources.

Figure 28:
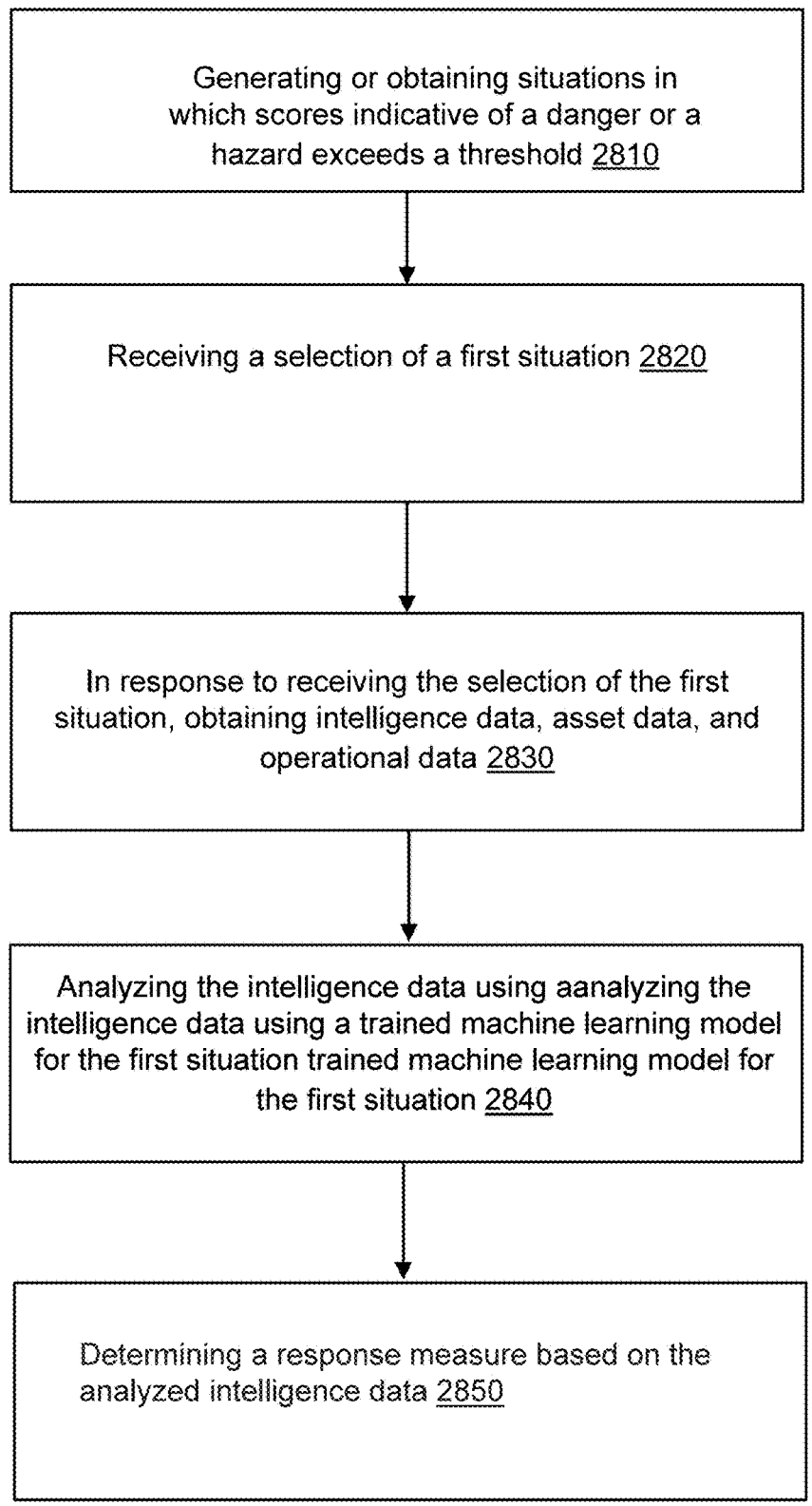
FIG. 28 illustrates a flowchart of an example method, in accordance with various embodiments.

FIG. 28 illustrates a flowchart of an example method 2800, according to various embodiments of the present disclosure. The method 2800 may be implemented in various environments including, for example, the environment 100 of FIG. 1. The operations of method 2800 presented below are intended to be illustrative. Depending on the implementation, the example method 2800 may include additional, fewer, or alternative steps performed in various orders or in parallel. The example method 2800 may be implemented in various computing systems or devices including one or more processors.

In step 2810, one or more processors may generating or obtaining situations in which scores indicative of a danger or a hazard exceeds a threshold. For example, the one or more processors may generate or obtain situations as a result of receiving an alert or other signal. In step 2820, the one or more processors may, in response to receiving the selection of the first situation, obtaining intelligence data, asset data, and operational data. In step 2830, the one or more processors may generate an assessment using the intelligence data, asset data, and operational data. In step 2840, the one or more processors may analyze the intelligence data using a trained machine learning model for the first situation. In step 2850, the one or more processors may determining a response measure based on the analyzed intelligence data. The one or more processors may implement the response measure, or transmit the response measure to a different processor or processors to implement the response measure.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 29:
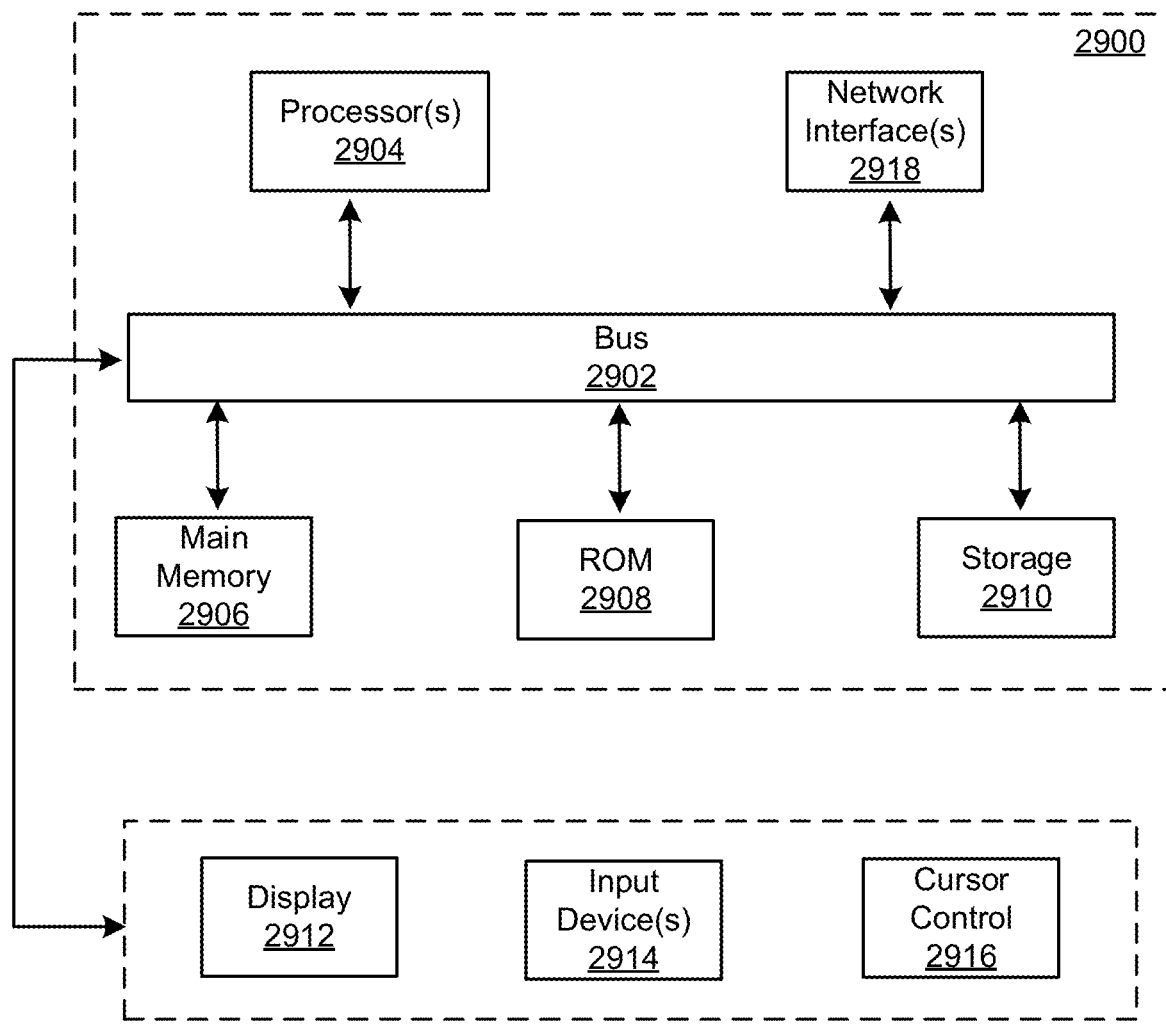
FIG. 29 illustrates a block diagram of an example computer system in which any of the embodiments described herein may be implemented.

FIG. 29 is a block diagram that illustrates a computer system 2900 upon which any of the embodiments described herein may be implemented. The computer system 2900 includes a bus 2902 or other communication mechanism for communicating information, one or more hardware processors 2904 coupled with bus 2902 for processing information.

Hardware processor(s) 2904 may be, for example, one or more general purpose microprocessors.

The computer system 2900 also includes a main memory 2906, such as a random access memory (RAM), cache and/or other dynamic storage devices, coupled to bus 2902 for storing information and instructions to be executed by processor 2904. Main memory 2906 also may be used for storing temporary variables or other intermediate information during execution of instructions to be executed by processor 2904. Such instructions, when stored in storage media accessible to processor 2904, render computer system 2900 into a special-purpose machine that is customized to perform the operations specified in the instructions.

The computer system 2900 further includes a read only memory (ROM) 2908 or other static storage device coupled to bus 2902 for storing static information and instructions for processor 2904. A storage device 2910, such as a magnetic disk, optical disk, or USB thumb drive (Flash drive), etc., is provided and coupled to bus 2902 for storing information and instructions.

The computer system 2900 may be coupled via bus 2902 to a display 2912, such as a cathode ray tube (CRT) or LCD display (or touch screen), for displaying information to a computer user. An input device 2914, including alphanumeric and other keys, is coupled to bus 2902 for communicating information and command selections to processor 2904. Another type of user input device is cursor control 2916, such as a mouse, a trackball, or cursor direction keys for communicating direction information and command selections to processor 2904 and for controlling cursor movement on display 2912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 2900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 2900 may implement the techniques described herein using customized hard-wired logic, one or more ASICs or FPGAs, firmware and/or program logic which in combination with the computer system causes or programs computer system 2900 to be a special-purpose machine. According to one embodiment, the techniques herein are performed by computer system 2900 in response to processor(s) 2904 executing one or more sequences of one or more instructions contained in main memory 2906. Such instructions may be read into main memory 2906 from another storage medium, such as storage device 2910. Execution of the sequences of instructions contained in main memory 2906 causes processor(s) 2904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 2910. Volatile media includes dynamic memory, such as main memory 2906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 2902. Transmission media can also take the form of acoustic or light waves, such as those generated during radio-wave and infra-red data communications.

Various forms of media may be involved in carrying one or more sequences of one or more instructions to processor 2904 for execution. For example, the instructions may initially be carried on a magnetic disk or solid state drive of a remote computer. The remote computer can load the instructions into its dynamic memory and send the instructions over a telephone line using a modem. A modem local to computer system 2900 can receive the data on the telephone line and use an infra-red transmitter to convert the data to an infra-red signal. An infra-red detector can receive the data carried in the infra-red signal and appropriate circuitry can place the data on bus 2902. Bus 2902 carries the data to main memory 2906, from which processor 2904 retrieves and executes the instructions. The instructions received by main memory 2906 may retrieves and executes the instructions. The instructions received by main memory 2906 may optionally be stored on storage device 2910 either before or after execution by processor 2904.

The computer system 2900 also includes a communication interface 2918 coupled to bus 2902. Communication interface 2918 provides a two-way data communication coupling to one or more network links that are connected to one or more local networks. For example, communication interface 2918 may be an integrated services digital network (ISDN) card, cable modem, satellite modem, or a modem to provide a data communication connection to a corresponding type of telephone line. As another example, communication interface 2918 may be a local area network (LAN) card to provide a data communication connection to a compatible LAN (or WAN component to communicated with a WAN). Wireless links may also be implemented. In any such implementation, communication interface 2918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 2918, which carry the digital data to and from computer system 2900, are example forms of transmission media.

The computer system 2900 can send messages and receive data, including program code, through the network(s), network link and communication interface 2918. In the Internet example, a server might transmit a requested code for an application program through the Internet, the ISP, the local network and the communication interface 2918.

The received code may be executed by processor 2904 as it is received, and/or stored in storage device 2910, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
    one or more processors;
    a display screen; and
    a memory storing instructions that, when executed by the one or more processors, cause the system to perform:
        generating or obtaining situations in which scores associated with an electronic component exceed a threshold;
        receiving a selection of a first situation;
        in response to receiving the selection of the first situation, obtaining security-related data, the security-related data being synchronized from different sensors and normalized;
        analyzing the security-related data using a trained machine learning model for the first situation;
        predicting a security-compromised electronic component associated with the asset;
        determining a response measure based on the analyzed security-related data, wherein the response measure comprises shutting down or deactivating the electronic component predicted to be security-compromised; and
        dynamically updating an interface of the display screen to depict at least a portion of the security-related data upon starting the response measure, wherein the dynamically updating the interface comprises displaying, on the display screen, a menu listing one or more applications, and an application summary directly reachable from the menu, wherein the application summary displays a condensed or limited view of data within one or more of the applications, at least an aspect of the data or a portion of the menu being selectable to launch the respective application and enable the aspect of the data to be seen within the respective application, and wherein the application summary is displayed while the one or more of the applications are in an unlaunched state.

2. The system of claim 1, wherein the machine learning model is trained using a sequential training process, the sequential training process comprising:
    training the machine learning model in a first stage using a first training set;
    creating a second training set for a second stage of training comprising a subset of the first training set that was incorrectly analyzed after the first stage of training; and
    training the machine learning model in the second stage using the second training set.

3. The system of claim 1, wherein the instructions further cause the system to perform:
    in response to obtaining security-related data, determining whether a metric of the obtained security-related data exceeds a threshold;
    in response to determining that the metric of the obtained security-related data exceeds a threshold, obtaining additional security-related data at a faster rate or from an additional source.

4. The system of claim 3, wherein the metric is indicative of a level of variability or volatility of the security-related data.

5. The system of claim 1, wherein the determination of the response measure is based on previous response measures corresponding to a same type of situation as the first situation and in which an extent of the same type of situation is within a threshold range of that of the first situation.

6. The system of claim 1, wherein the instructions further cause the system to perform:
    in response to determining a response measure based on the analyzed security-related data, transmitting the determined response measure to a different computing system to implement the response measure.

7. The system of claim 1, wherein the instructions further cause the system to perform:
    generating a first video of the analyzed security-related data on a user interface;
    detecting a selection or an interaction with an aspect of the security-related data on the user interface; and
    in response to the detection, generating a second video of the aspect that is larger than the first video as an overlay.

8. A computer-implemented method, comprising:
generating or obtaining situations in which scores associated with an electronic component exceed a threshold;
receiving a selection of a first situation;
in response to receiving the selection of the first situation, obtaining security-related data, the security-related data being synchronized from different sensors and normalized;
analyzing the security-related data using a trained machine learning model for the first situation;
predicting a security-compromised electronic component associated with the asset;
determining a response measure based on the analyzed security-related data, wherein the response measure comprises shutting down or deactivating the electronic component predicted to be security-compromised; and
dynamically updating an interface of the display screen to depict at least a portion of the security-related data upon starting the response measure, wherein the dynamically updating the interface comprises displaying, on the display screen, a menu listing one or more applications, and an application summary directly reachable from the menu, wherein the application summary displays a condensed or limited view of data within one or more of the applications at least an aspect of the data or a portion of the menu being selectable to launch the respective application and enable the aspect of the data to be seen within the respective application, and wherein the application summary is displayed while the one or more of the applications are in an unlaunched state.

9. The computer-implemented method of claim 8, wherein the machine learning model is trained using a sequential training process, the sequential training process comprising:
training the machine learning model in a first stage using a first training set;
creating a second training set for a second stage of training comprising a subset of the first training set that was incorrectly analyzed after the first stage of training; and
training the machine learning model in the second stage using the second training set.

10. The computer-implemented method of claim 8, further comprising:
in response to obtaining security-related data, determining whether a metric of the obtained security-related data exceeds a threshold;
in response to determining that the metric of the obtained security-related data exceeds a threshold, obtaining additional security-related data at a faster rate or from an additional source.

11. The computer-implemented method of claim 10, wherein the metric is indicative of a level of variability or volatility of the security-related data.

12. The computer-implemented method of claim 8, wherein the determination of the response measure is based on previous response measures corresponding to a same type of situation as the first situation and in which an extent of the same type of situation is within a threshold range of that of the first situation.

13. The computer-implemented method of claim 8, further comprising:
in response to determining a response measure based on the analyzed security-related data, transmitting the determined response measure to a different computing system to implement the response measure.

14. The computer-implemented method of claim 8, further comprising:
generating a first video of the analyzed security-related data on a user interface;
detecting a selection or an interaction with an aspect of the security-related data on the user interface; and
in response to the detection, generating a second video of the aspect that is larger than the first video as an overlay.

15. A non-transitory storage medium storing instructions that, when executed by at least one processor of a computing system, cause the computing system to perform a method comprising:
generating or obtaining situations in which scores associated with an electronic component exceed a threshold;
receiving a selection of a first situation;
in response to receiving the selection of the first situation, obtaining security-related data, the security-related data being synchronized from different sensors and normalized;
analyzing the security-related data using a trained machine learning model for the first situation;
predicting a security-compromised electronic component associated with the asset;
determining a response measure based on the analyzed security-related data, wherein the response measure comprises shutting down or deactivating the electronic component predicted to be security-compromised; and
dynamically updating an interface of the display screen to depict at least a portion of the security-related data upon starting the response measure, wherein the dynamically updating the interface comprises displaying, on the display screen, a menu listing one or more applications, and an application summary directly reachable from the menu, wherein the application summary displays a condensed or limited view of data within one or more of the applications, at least an aspect of the data or a portion of the menu being selectable to launch the respective application and enable the aspect of the data to be seen within the respective application, and wherein the application summary is displayed while the one or more of the applications are in an unlaunched state.

16. The non-transitory storage medium of claim 15, wherein the machine learning model is trained using a sequential training process, the sequential training process comprising:
training the machine learning model in a first stage using a first training set;
creating a second training set for a second stage of training comprising a subset of the first training set that was incorrectly analyzed after the first stage of training; and
training the machine learning model in the second stage using the second training set.

17. The non-transitory storage medium of claim 15, wherein the method further comprises:
in response to obtaining security-related data, determining whether a metric of the obtained security-related data exceeds a threshold;
in response to determining that the metric of the obtained security-related data exceeds a threshold, obtaining additional security-related data at a faster rate or from an additional source.

18. The non-transitory storage medium of claim 15, wherein the determination of the response measure is based on previous response measures corresponding to a same type of situation as the first situation and in which an extent of the same type of situation is within a threshold range of that of the first situation.

19. The non-transitory storage medium of claim 15, wherein the method further comprises:
   in response to determining a response measure based on the analyzed security-related data, transmitting the determined response measure to a different computing system to implement the response measure.

20. The system of claim 1, wherein the system is implemented by one or more application-specific integrated circuits (ASICs) or field programmable gate arrays (FPGAs).

* * * * *